(12) United States Patent
Shatalov

(10) Patent No.: US 10,751,663 B2
(45) Date of Patent: Aug. 25, 2020

(54) ULTRAVIOLET TREATMENT OF VOLATILE ORGANIC COMPOUNDS

(71) Applicant: Sensor Electronic Technology, Inc., Columbia, SC (US)

(72) Inventor: Maxim S. Shatalov, Columbia, SC (US)

(73) Assignee: Sensor Electronic Technology, Inc., Columbia, SC (US)

( * ) Notice: Subject to any disclaimer, the term of this patent is extended or adjusted under 35 U.S.C. 154(b) by 263 days.

(21) Appl. No.: 15/997,896

(22) Filed: Jun. 5, 2018

(65) Prior Publication Data

US 2019/0030477 A1 Jan. 31, 2019

Related U.S. Application Data

(60) Provisional application No. 62/538,908, filed on Jul. 31, 2017.

(51) Int. Cl.

| | | |
|---|---|---|
| *B01D 53/00* | (2006.01) | |
| *B01D 53/56* | (2006.01) | |
| *B01D 53/72* | (2006.01) | |
| *B01D 53/86* | (2006.01) | |
| *F02M 25/12* | (2006.01) | |
| *F02M 27/06* | (2006.01) | |

(Continued)

(52) U.S. Cl.
CPC .......... *B01D 53/007* (2013.01); *B01D 53/56* (2013.01); *B01D 53/72* (2013.01); *B01D 53/8625* (2013.01); *B01D 53/9454* (2013.01); *B01J 19/123* (2013.01); *F02M 25/12* (2013.01); *F02M 27/06* (2013.01); *B01D 53/8668* (2013.01); *B01D 2255/1021* (2013.01); *B01D 2255/1023* (2013.01); *B01D 2255/2073* (2013.01); *B01D 2255/20707* (2013.01); *B01D 2255/20738* (2013.01); *B01D 2255/20769* (2013.01); *B01D 2255/20784* (2013.01); *B01D 2255/802* (2013.01); *B01D 2257/404* (2013.01); *B01D 2257/708* (2013.01); *B01D 2259/804* (2013.01)

(58) Field of Classification Search
CPC ............................ B01D 53/007; B01J 19/123
USPC ...................................... 422/168, 186.3, 187
See application file for complete search history.

(56) References Cited

U.S. PATENT DOCUMENTS

| | | |
|---|---|---|
| 5,256,379 A | 10/1993 | DeLoach |
| 5,670,122 A | 9/1997 | Zamansky et al. |

(Continued)

*Primary Examiner* — Robert A Hopkins
(74) *Attorney, Agent, or Firm* — LaBatt, LLC

(57) ABSTRACT

A system for providing ultraviolet treatment of volatile organic compounds (VOCs) is disclosed. The system can include a first gas conduit to carry a stream of gas having VOCs and a second gas conduit to carry a second stream of gas containing a partial pressure of water vapor. A gas treatment unit can be coupled to the first gas conduit and the second gas conduit. The gas treatment unit can form hydroxyl radicals from the water vapor in the stream of gas carried by the second gas conduit and inject the radicals in the first gas conduit to decrease the presence of the VOCs. The gas treatment unit can include a photocatalyst component and at least one ultraviolet radiation source to irradiate the photocatalyst component with ultraviolet radiation. To this extent, the irradiated photocatalyst component disassociates the gas containing the water vapor to form the hydroxyl radicals.

20 Claims, 8 Drawing Sheets

(51) Int. Cl.
  *B01D 53/94* (2006.01)
  *B01J 19/12* (2006.01)

(56) References Cited

U.S. PATENT DOCUMENTS

| | | | |
|---|---|---|---|
| 5,863,413 | A | 1/1999 | Caren et al. |
| 6,969,486 | B1 | 11/2005 | Cooper et al. |
| 7,156,957 | B1 | 1/2007 | Parrish et al. |
| 7,498,009 | B2 | 3/2009 | Leach et al. |
| 7,553,456 | B2 | 6/2009 | Gaska et al. |
| 7,634,996 | B2 | 12/2009 | Gaska et al. |
| 8,277,734 | B2 | 10/2012 | Koudymov et al. |
| 8,980,178 | B2 | 3/2015 | Gaska et al. |
| 9,006,680 | B2 | 4/2015 | Bettles et al. |
| 9,034,271 | B2 | 5/2015 | Shur et al. |
| 9,061,082 | B2 | 6/2015 | Gaska et al. |
| 9,138,499 | B2 | 9/2015 | Bettles et al. |
| 9,179,703 | B2 | 11/2015 | Shur et al. |
| 9,572,903 | B2 | 2/2017 | Dobrinsky et al. |
| 9,603,960 | B2 | 3/2017 | Dobrinsky et al. |
| 9,687,577 | B2 | 6/2017 | Dobrinsky et al. |
| 9,707,307 | B2 | 7/2017 | Shur et al. |
| 9,718,706 | B2 | 8/2017 | Smetona et al. |
| 9,724,441 | B2 | 8/2017 | Shur et al. |
| 9,750,830 | B2 | 9/2017 | Shur et al. |
| 9,757,486 | B2 | 9/2017 | Dobrinsky et al. |
| 9,795,699 | B2 | 10/2017 | Shur et al. |
| 9,801,965 | B2 | 10/2017 | Bettles et al. |
| 9,802,840 | B2 | 10/2017 | Shturm et al. |
| 9,878,061 | B2 | 1/2018 | Shur et al. |
| 9,919,068 | B2 | 3/2018 | Shur et al. |
| 9,974,877 | B2 | 5/2018 | Bettles et al. |
| 9,981,051 | B2 | 5/2018 | Shur et al. |
| 9,987,383 | B2 | 6/2018 | Bilenko et al. |
| 10,099,944 | B2 | 10/2018 | Smetona et al. |
| 2013/0048545 | A1 | 2/2013 | Shatalov et al. |
| 2014/0202962 | A1 | 7/2014 | Bilenko et al. |
| 2015/0114822 | A1* | 4/2015 | Greco ............... B01D 53/885 204/158.21 |
| 2015/0297767 | A1 | 10/2015 | Gaska et al. |
| 2015/0336810 | A1 | 11/2015 | Smetona et al. |
| 2016/0114186 | A1 | 4/2016 | Dobrinsky et al. |
| 2017/0057842 | A1 | 3/2017 | Dobrinsky et al. |
| 2017/0100494 | A1 | 4/2017 | Dobrinsky et al. |
| 2017/0100495 | A1 | 4/2017 | Shur et al. |
| 2017/0189711 | A1 | 7/2017 | Shur et al. |
| 2017/0245527 | A1 | 8/2017 | Dobrinsky et al. |
| 2017/0245616 | A1 | 8/2017 | Lakios et al. |
| 2017/0281812 | A1 | 10/2017 | Dobrinsky et al. |
| 2017/0290934 | A1 | 10/2017 | Dobrinsky et al. |
| 2017/0368215 | A1 | 12/2017 | Shatalov et al. |
| 2018/0028700 | A1 | 2/2018 | Dobrinsky et al. |
| 2018/0092308 | A1 | 4/2018 | Barber et al. |
| 2018/0104368 | A1 | 4/2018 | Dobrinsky et al. |
| 2018/0117194 | A1 | 5/2018 | Dobrinsky et al. |
| 2018/0185529 | A1 | 7/2018 | Shur et al. |
| 2018/0221521 | A1 | 8/2018 | Shur et al. |
| 2018/0243458 | A1 | 8/2018 | Shatalov et al. |
| 2018/0339075 | A1 | 11/2018 | Kennedy et al. |

* cited by examiner

Exhaust Treatment

Pre-burn treatment

ULTRAVIOLET TREATMENT OF VOLATILE ORGANIC COMPOUNDS

REFERENCE TO RELATED APPLICATIONS

The present patent application claims the benefit of U.S. Provisional Application No. 62/538,908, which was filed on 31 Jul. 2017, and which is hereby incorporated by reference.

TECHNICAL FIELD

This disclosure relates generally to ultraviolet treatment, and more specifically, to a solution for using ultraviolet radiation to treat volatile organic compounds (VOCs) in a gas stream with a photocatalyst in order to reduce the presence of the VOCs in the gas stream.

BACKGROUND ART

Volatile organic compounds (VOCs) such as nitride oxide (NOx) and other air pollutants like carbon monoxide (CO) are often found in combustion exhaust gases. Various approaches have been used to control VOCs. Selective catalytic reduction (SCR) is one technique that is often used to control VOCs. SCR involves injecting a liquid-reductant agent through a special catalyst into the exhaust stream of an engine. The liquid-reductant agent sets off a chemical reaction that converts NOx into nitrogen, water and tiny amounts of carbon dioxide ($CO_2$). One drawback with SCR is that it typically requires the use of expensive catalytic materials such as platinum. Another approach to controlling VOCs involves using hydrogen peroxide and/or methanol to react with the VOCs and oxidize the harmful gases. This approach is not preferred because it relies on storing hydrogen peroxide and/or methanol which increases weight and may pose potential health risks to humans in case of heavy exposure. Furthermore, the use of hydrogen peroxide and/or methanol have not shown to be efficient in removing VOCs from an exhaust stream of gases.

SUMMARY OF THE INVENTION

This Summary Of The Invention introduces a selection of certain concepts in a brief form that are further described below in the Detailed Description Of The Invention. It is not intended to exclusively identify key features or essential features of the claimed subject matter set forth in the Claims, nor is it intended as an aid in determining the scope of the claimed subject matter.

Aspects of the present invention are directed to a gas treatment system that uses ultraviolet radiation to treat volatile organic compounds (VOCs) in a gas stream with a photocatalyst in order to reduce the presence of the VOCs. The gas stream can include exhaust gases or flue gases that are conveyed into the atmosphere by a conduit, a duct, a pipe, a channel, a flue, or the like. Embodiments of the present invention are also applicable to a gas stream including a fuel like natural gas, gasoline, petrol, biodiesel blends, etc., that is supplied for use in a combustion process.

The gas treatment system of the illustrative embodiments described herein can include a first gas conduit, a second gas conduit, and a gas treatment unit operatively coupled to the first gas conduit and the second gas conduit. The first gas conduit can have a primary inlet, at least one secondary inlet, and an outlet. The first gas conduit is configured to carry a first stream of gas having a presence of VOCs that enters the first conduit through the primary inlet for release at the outlet. The second gas conduit can have an inlet that receives a second stream of gas containing at least a partial pressure of water vapor and an outlet coupled to the secondary inlet of the first gas conduit. The gas treatment unit, which can be a separate component or integrated within the second gas conduit, is configured to form hydroxyl radicals from the water vapor in the stream of gas carried by the second gas conduit, and inject the hydroxyl radicals in the first gas conduit through the secondary inlet to decrease the presence of volatile organic compounds in the first stream of gas.

The gas treatment unit can include a photocatalyst component that is configured to receive the second stream of gas. In one embodiment, the photocatalyst component can be positioned within the second stream of gas. The photocatalyst component can include one of a variety of shapes and materials that can effectuate a catalytic effect on the second stream of gas. In one embodiment, the photocatalyst component can include at least two commonly-shaped elements positioned within the second stream of gas. For example, the at least two commonly-shaped elements can include elliptical-shaped elements that receive all of the second stream of gas. In another embodiment, the at least two commonly-shaped elements can include rectangular-shaped elements spaced apart from each other, with both located centrally with respect to the second stream of gas. The photocatalyst component can be coated or constructed with catalytic metals and/or catalytic oxides. Examples of catalytic metals can include, but are not limited to, Fe(II), Cr(II), Pt black and Pd, while examples of catalytic oxides can include, but are not limited to, $TiO_2$, FeO, $Fe_2O_3$, $Fe_3O_4$, $MnO_2$ and $MoO_2$.

The gas treatment unit can also include at least one ultraviolet radiation source configured to irradiate the photocatalyst component with ultraviolet radiation. In this manner, the irradiated photocatalyst component can disassociate the second stream of gas with a partial pressure of water vapor for formation of the hydroxyl radicals. In one embodiment, the at least one ultraviolet radiation source can include a set of ultraviolet light emitting devices. The set ultraviolet light emitting devices can be positioned on an internal surface of the gas treatment unit. For example, some or all of the set of ultraviolet light emitting devices can be positioned upstream of the photocatalyst component and oriented to generate ultraviolet radiation towards the photocatalyst component. In another embodiment, some or all of the set of ultraviolet light emitting devices can be positioned on the internal surface of the gas treatment unit to encircle the catalyst component and oriented to direct the radiation to specific regions of the catalyst component. The internal walls of the gas treatment unit can include ultraviolet reflective walls that recycle the ultraviolet radiation.

Some or all of the set of ultraviolet light emitting devices can also be located on the exterior surface of the gas treatment unit and configured to irradiate the catalyst component through ultraviolet transparent windows formed on the gas treatment unit. In one embodiment, the set of ultraviolet light emitting devices can be configured to operate in a pulsed mode. For example, a first group of ultraviolet light emitting devices can be configured to produce a first burst of ultraviolet radiation and a second group of ultraviolet light emitting devices can be configured to produce a second burst of ultraviolet radiation.

The photocatalyst component can be positioned within the second stream of gas to maintain a specified density and concentration level of hydroxyl radicals that are supplied into the secondary inlet of the first gas conduit. In one embodiment, the photocatalyst component can be positioned at a predetermined distance from the secondary inlet of the first gas conduit, wherein the predetermined distance maintains at least a 30% density level of hydroxyl radicals that is supplied into the first gas conduit at the secondary inlet. Maintaining at least a 30% density level of hydroxyl radicals from the point of formation of the radicals at the secondary inlet of the first gas conduit is sufficient to reduce the presence of VOCs in the first gas stream. Maintaining the at least 30% density level of hydroxyl radicals at the secondary inlet of the first gas conduit can be a function of one or more of a plurality of hydroxyl formation parameters that affect the formation of the hydroxyl radicals by the irradiated photocatalyst component. For example, hydroxyl formation parameters can include, but are not limited to, the density of the water vapor in the second stream of gas, the flow speed of the second stream of gas, the temperature of the second stream of gas, the pressure of the second stream of gas, and the radiation intensity irradiating the photocatalyst component. Calibrating or adjusting one or more of these parameters to account for thermodynamic and chemical properties of the gas in the first gas conduit enables one to maintain a predetermined density level of hydroxyl radicals (e.g., at 30%) that is supplied to the first gas conduit.

The gas treatment unit can be configured with a predetermined shape that enhances recycling of ultraviolet radiation generated from the at least one ultraviolet radiation source and the photocatalytic effect provided by the photocatalyst component. In one embodiment, the gas treatment unit can be configured with a radiative chamber that includes the at least one ultraviolet radiation source and the photocatalyst component. For example, the radiative chamber can have a conical expanding shape coupled to the outlet of the second gas conduit. The radiative chamber can also include complex shapes with large surfaces that improve the photocatalytic effect of the photocatalyst component.

The gas treatment system of the illustrative embodiments described herein can further include a water storage unit containing water that is operatively coupled with the first gas conduit and the second gas conduit. In one embodiment, the water in the water storage unit can be heated by the gas in the first gas conduit. To this extent, the heated water in the water storage unit can impart a predetermined partial pressure level of water vapor in the stream of gas carried by the second gas conduit through heat transfer. In one embodiment, the water storage unit can supply heated water directly into the second gas conduit. For example, the water storage unit can include a valve to control a flow of heated water from the water storage unit to the second gas conduit.

In one embodiment, the second gas conduit can be configured with a gas moving component that is configured to direct the second stream of gas containing at least a partial pressure of water vapor through the second conduit and the gas treatment unit for supply to the first gas conduit through the secondary inlet. A propeller device is a non-limiting example of a gas moving component that can be used to direct the second stream of gas through the second gas conduit and the gas treatment unit and into the first gas conduit.

In one embodiment, the second gas conduit can be configured to include at least one sensor located about the second stream of gas to attain operational data (e.g., operating conditions) associated with the second stream of gas. For example, a humidity sensor can be configured to measure an amount of water vapor in the stream of gas about the inlet of the second gas conduit. Other sensors can include, but are not limited to, a temperature sensor, a pressure sensor, and a gas flow sensor.

In one embodiment, a control unit can be configured with the second gas conduit and/or the gas treatment unit to control or manage the treatment of the gas streams. For example, the control unit can be operatively coupled to any of the sensors, the water storage unit, the gas moving component, and/or the ultraviolet radiation source or set of ultraviolet radiation sources. In this manner, the control unit can adjust the temperature of the water in the water storage unit, the intensity of radiation emitted from the ultraviolet radiation source(s), and the flow of the second stream of gas that is enabled by the gas moving component in response to the conditions detected by the sensor(s). To this extent, the control unit can manage the formation of the hydroxyl radicals and control the density and concentration level of the hydroxyl radicals at the secondary inlet of the first gas conduit that is sufficient to reduce the presence of the VOCs in the first gas stream.

The gas treatment system of the illustrative embodiments described herein can be further implemented with one of a number of other devices that can facilitate the reduction of VOCs in the first gas conduit. In one embodiment, an ozone generator can be located about the inlet of the second gas conduit to generate ozone in the stream of gas. To this extent, the irradiated photocatalyst component can disassociate both the water vapor and the ozone in the second stream of gas, leading to an increased formation of the hydroxyl radicals. In one embodiment, a plasma generator can be positioned about the outlet of the first gas conduit to ionize any presence of VOCs in the stream of gas that remains in the first gas conduit after treatment by the hydroxyl radicals supplied by the second gas conduit. In one embodiment, a catalytic converter can be positioned about the outlet of the first gas conduit to oxidize any presence of VOCs in the stream of gas that remains in the first gas conduit after treatment by the hydroxyl radicals supplied by the second gas conduit.

The gas treatment system of the illustrative embodiments described herein can be configured such that the second gas conduit and the gas treatment unit maintain a positive pressure with respect to the first gas conduit. In one embodiment, a sod filtering unit can be located about the secondary inlet of the first gas conduit and the outlet of the second gas conduit to further ensure that the second gas conduit and the gas treatment unit maintain a positive pressure with respect to the first gas conduit. In addition, the sod filtering unit can prevent sod in the first gas conduit from entering the second gas conduit and impacting the production and supply of the hydroxyl radicals.

A first aspect of the invention provides a system, comprising: a first gas conduit having a primary inlet, a secondary inlet, and an outlet, wherein the first gas conduit is configured to carry a stream of gas having a presence of volatile organic compounds (VOCs) that enters the first conduit through the primary inlet and exits the first conduit at the outlet; a second gas conduit having an inlet that receives a stream of treatment gas containing at least a partial pressure of water vapor, an outlet coupled to the secondary inlet of the first gas conduit, and a radiative chamber formed between the inlet of the second gas conduit and the outlet of the second gas conduit to receive the stream of treatment gas; a photocatalyst component positioned within the radiative chamber of the second gas conduit; and a set of ultraviolet radiation sources to irradiate the photocatalyst component with ultraviolet radiation, wherein the irradiated photocatalyst component disassociates the treatment gas into hydroxyl radicals, wherein the photocatalyst component is positioned at a predetermined distance from the outlet of the second gas conduit, wherein the predetermined distance maintains at least a 30% density level of hydroxyl radicals at the outlet of the second gas conduit for supply into the first gas conduit at the secondary inlet for treating the stream of gas to reduce the presence of the VOCs.

A second aspect of the invention provides a system, comprising: a first gas conduit having a primary inlet, a secondary inlet, and an outlet, wherein the first gas conduit is configured to carry a first stream of gas having a presence of volatile organic compounds (VOCs) that enters the first conduit through the primary inlet and exits the first conduit at the outlet; a second gas conduit having an inlet that receives a stream of treatment gas and an outlet coupled to the secondary inlet of the first gas conduit; a water storage unit containing water that is operatively coupled with the first gas conduit and the second gas conduit, wherein the water in the water storage unit is heated by the gas in the first gas conduit, the heated water in the water storage unit imparting a predetermined partial pressure level of water vapor in the stream of treatment gas carried by the second gas conduit; a gas moving component configured to direct the stream of treatment gas containing at least a partial pressure of water vapor towards the outlet of the second gas conduit for supply to the first gas conduit through the secondary inlet; a gas treatment unit operatively coupled to the first gas conduit and the second gas conduit, wherein the gas treatment unit is configured to produce hydroxyl radicals from the water vapor in the stream of treatment gas carried by the second gas conduit and inject the hydroxyl radicals in the first gas conduit through the secondary inlet to decrease a presence of VOCs in the first stream of gas, the gas treatment unit including: a photocatalyst component configured to receive the stream of treatment gas containing the at least a partial pressure of water vapor; and at least one ultraviolet radiation source configured to irradiate the photocatalyst component with ultraviolet radiation, wherein the irradiated photocatalyst component disassociates the treatment gas containing at least a partial pressure of water vapor for formation of the hydroxyl radicals, wherein the photocatalyst component is positioned at a predetermined distance from the secondary inlet of the first gas conduit, wherein the predetermined distance maintains at least a 30% density level of hydroxyl radicals at the secondary inlet for treating the stream of gas in the first gas conduit to reduce the presence of the VOCs.

A third aspect of the invention provides a system, comprising: an internal combustion engine; a gas conduit to supply fuel to the internal combustion engine for combustion of the fuel; an exhaust gas conduit to release exhaust gases from the internal combustion engine after combustion of the fuel; and a gas treatment unit, operatively coupled to at least one of the gas conduit or the exhaust gas conduit, to supply hydroxyl radicals that decrease a presence of volatile organic compounds (VOCs) in the gas conduits, the gas treatment unit including: a gas treatment conduit having an inlet that receives a stream of treatment gas containing at least a partial pressure of water vapor, an outlet coupled to at least one of the gas conduit or the exhaust gas conduit; a gas moving component configured to direct the stream of treatment gas containing the at least a partial pressure of water vapor towards the outlet of the gas treatment conduit for supply to at least one of the gas conduit or the exhaust gas conduit; a photocatalyst component configured to receive the stream of treatment gas containing the at least a partial pressure of water vapor driven by the gas moving component; and at least one ultraviolet radiation source configured to irradiate the photocatalyst component with ultraviolet radiation, wherein the irradiated photocatalyst component disassociates the treatment gas into the hydroxyl radicals, wherein the photocatalyst component is positioned at a predetermined distance from the outlet of the gas treatment conduit, wherein the predetermined distance maintains at least a 30% density level of hydroxyl radicals delivered to the outlet of the gas treatment conduit by the gas moving component for supply into at least one of the gas conduit or the exhaust gas conduit, for treating the VOCs.

The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
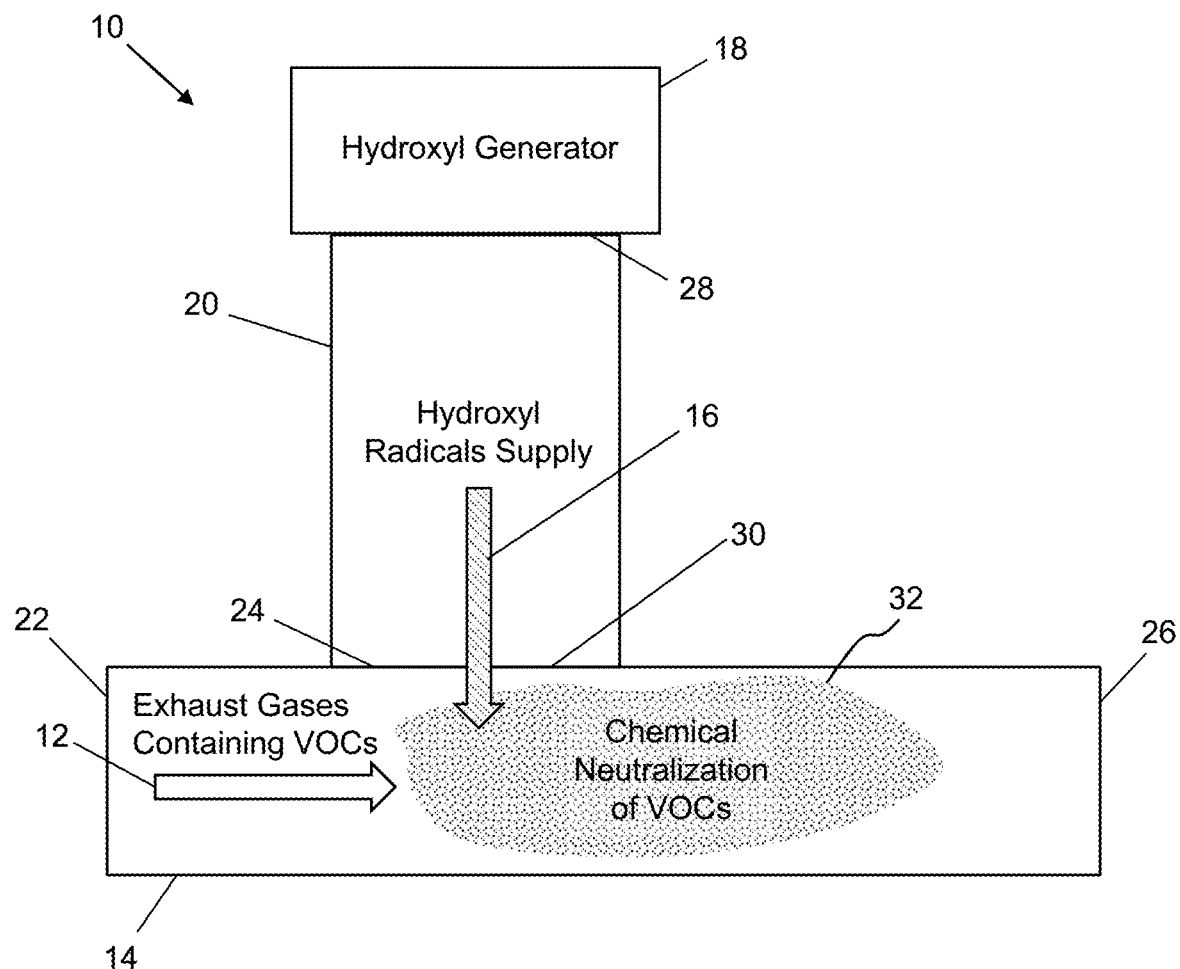
FIG. 1 shows a schematic of a gas treatment system for treating a gas stream carried in a first gas conduit with a supply of hydroxyl radicals provided by a hydroxyl generator via a second gas conduit according to an embodiment.

As indicated above, aspects of the invention are directed to a gas treatment system that uses ultraviolet radiation and a photocatalyst to treat volatile organic compounds (VOCs). VOCs, which are typically emitted as gases can occur in many forms with some more harmful than others, and different sources can emit different forms of VOCs. The embodiments of the present invention are suitable for use with combustion engines such as internal combustion engines that are fed with fossil fuels like natural gas, petroleum products (e.g., gasoline, diesel fuels) or renewable fuels (e.g., biodiesel) and generate exhaust gases containing VOCs that could be emitted into the atmosphere via a conduit of some sort. The VOCs in this form generally include hydrocarbons that can evaporate quickly and easily into the air and react with other air pollutants such as nitrogen oxide (NOx) and carbon monoxide (CO) to produce undesirable effects in the atmosphere.

Ultraviolet radiation, which can be used interchangeably with ultraviolet light, means electromagnetic radiation having a wavelength ranging from approximately 10 nm to approximately 400 nm. Within this range, there is ultraviolet-A (UV-A) electromagnetic radiation having a wavelength ranging from approximately 315 nm to approximately 400 nm, ultraviolet-B (UV-B) electromagnetic radiation having a wavelength ranging from approximately 280 nm to approximately 315 nm, and ultraviolet-C (UV-C) electromagnetic radiation having a wavelength ranging from approximately 100 nm to approximately 280 nm.

As used herein, a material/structure is considered to be "reflective" to ultraviolet light of a particular wavelength when the material/structure has an ultraviolet reflection coefficient of at least 30 percent for the ultraviolet light of the particular wavelength. A highly ultraviolet reflective material/structure has an ultraviolet reflection coefficient of at least 80 percent. Furthermore, a material/structure/layer is considered to be "transparent" to ultraviolet radiation of a particular wavelength when the material/structure/layer allows at least ten percent of radiation having a target wavelength, which is radiated at a normal incidence to an interface of the material/structure/layer to pass there through. Also, unless otherwise noted, the term "set" means one or more (i.e., at least one) and the phrase "any solution" means any now known or later developed solution.

The gas treatment systems described herein can include various combinations of a number of components described below in more detail, some of which may be optional, that facilitate the reduction VOCs within a gas stream that is to be released into the atmosphere. Embodiments of gas treatment systems described herein are not limited to the particular combinations of components shown in the drawings. To this extent, a gas treatment system described herein can include a combination of components shown only in different drawings. The modalities used with the various gas treatment systems described herein including its respective components can include any now known or later developed approaches that incorporate the concepts of the embodiments described below in more detail.

Turning to the drawings, FIG. 1 shows a schematic of a gas treatment system 10 for treating a gas stream 12 containing VOCs carried in a first gas conduit 14 with hydroxyl radicals (OH) 16 produced by a hydroxyl generator 18 and supplied by a second gas conduit 20 according to an embodiment. In one embodiment, the first gas conduit 14 is an exhaust gas conduit that carries exhaust gas or flue gas emitted as result of the combustion of fuel in a combustion engine. For clarity in explaining the embodiment depicted in FIG. 1 as well as the other embodiments, the combustion engine is not illustrated in the figures. However, it is understood that the gas treatment systems of the various embodiments are suitable for use with any combustion engine such as an internal combustion engine or combustion process that emits exhaust gas from the combustion of fuel into the atmosphere through some type of conduit. A non-exhaustive list of internal combustion engines can include spark-ignition engines, diesel engines, gas turbine engines, jet engines, and rocket engines, while a non-exhaustive list of combustion processes can be utilized in industrial plants and power plants.

The gas conduit 14 can include a primary inlet 22, at least one secondary inlet 24 (e.g., downstream of the primary inlet), and an outlet 26, while the gas conduit 20 can include an inlet 28 and an outlet 30. To this extent, the primary inlet 22 of the gas conduit 14 receives the stream 12 of exhaust gases containing VOCs, e.g., from a combustion chamber associated with a combustion engine or combustion process, while the inlet 28 of the gas conduit 20 receives the supply 16 of hydroxyl radicals from the hydroxyl generator 18 and delivers it into the secondary inlet 24 of the gas conduit 14 via the outlet 30. Although this embodiment discloses the use of conduits to distribute the exhaust gases and the supply of hydroxyl radicals, it is understood that other gas and liquid transport devices that are suitable for combustion engine or combustion process applications can be used with the embodiment depicted in FIG. 1, as well as the embodiments associated with the other figures. Examples of other gas and liquid transport devices that can be used to distribute the exhaust gases and the supply of hydroxyl radicals in a typical mechanical environment can include, but are not limited to, ducts, pipes, tubes, conduits, hoses, lines, channels, and flues.

The hydroxyl generator 18 can include an outside air intake, a pre-filter, a photocatalytic filter and a source of ultraviolet radiation. For example, a photocatalytic filter may comprise a ceramic or fiber material coated with $TiO_2$. Examples of an ultraviolet radiation source suitable for use with the hydroxyl generator may include, but are not limited to an ultraviolet light emitting diode (LED), an ultraviolet LED array, and an ultraviolet lamp. The hydroxyl radicals can be formed by passing oxygen and water vapor in the proximity of a photocatalyst. The photocatalyst can transfer or capture an electron from oxygen and water vapor resulting in either the ionized oxygen, or reactive hydroxyl radical being formed.

After formation, the hydroxyl radicals can react with compounds such as methane ($CH_4$), NOx, CO and other non-methane VOCs to form an oxidation product that can include more hydroxyl radicals and $O_2$. As shown in FIG. 1, the hydroxyl radicals 16 enter the secondary inlet 24 of the gas conduit 14 and react with the stream of exhaust gases 12 containing VOCs for chemical neutralization of the VOCs 32. In essence, the stream of exhaust gases 12 containing VOCs is oxidized by the hydroxyl radicals and scrubbed of the VOCs. To this extent, the stream of gas 12 can exit the outlet 26 of the gas conduit 14 into the atmosphere with a reduced amount of VOCs.

Other scrubbing systems can be utilized with the gas treatment system 10 in order to further reduce the presence of VOCs in the gas stream that exits the outlet 26 of the gas conduit 14 into the atmosphere. In one embodiment, a catalytic converter can be positioned at the outlet 26 of the gas conduit 14 to further reduce the VOCs from the chemically neutralized stream 32. The catalytic converter can include, but is not limited to ultraviolet radiation based catalytic converters, which can cause photocatalytic oxidation with titanium dioxide. Other wet and/or dry scrubbing systems can be used to complement the chemical neutralization of the VOCs provided by the use of the hydroxyl radicals.

Figure 2:
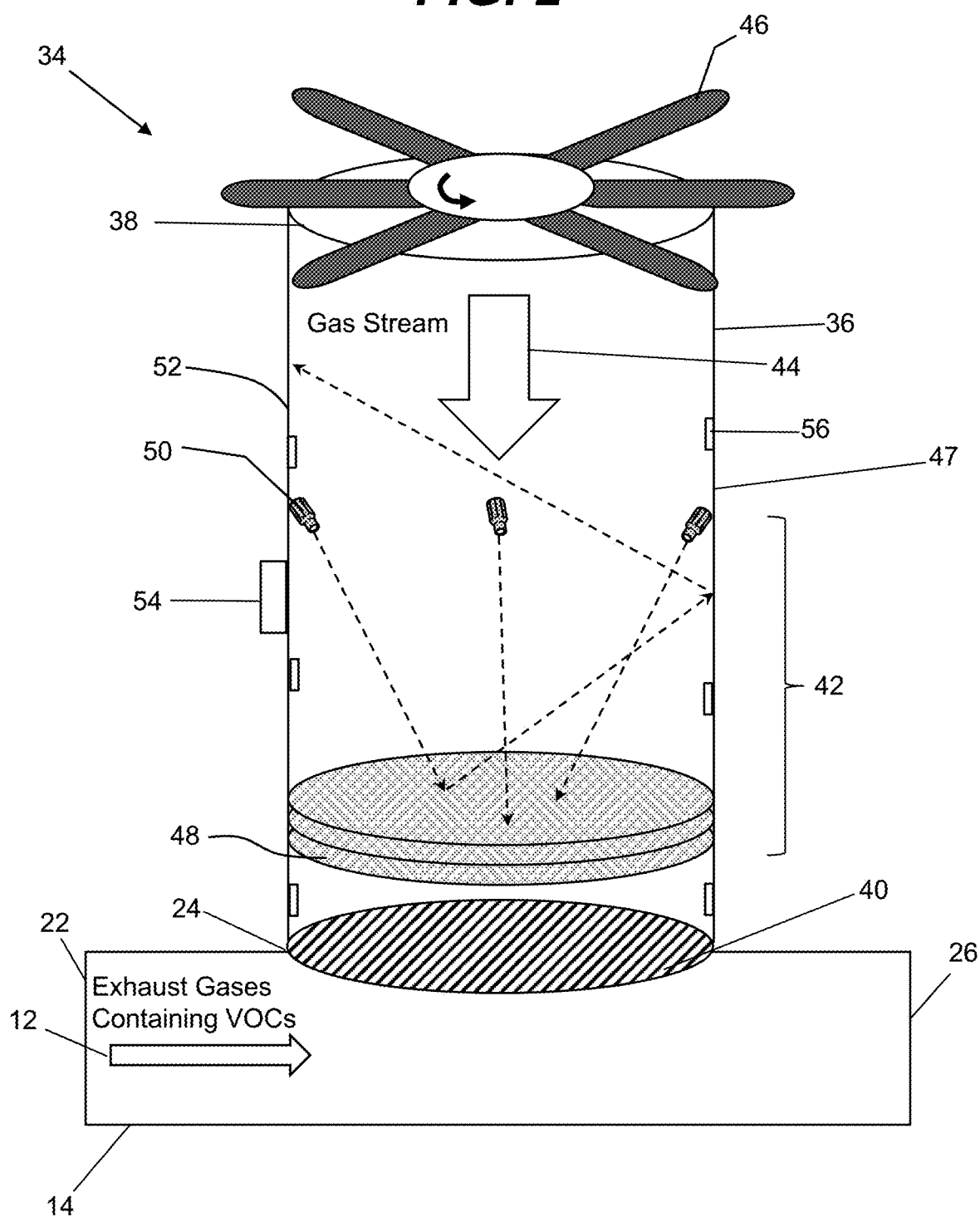
FIG. 2 shows a schematic of a gas treatment system for treating a gas stream carried in a first gas conduit with hydroxyl radicals supplied by a second gas conduit having a set of ultraviolet radiation sources and a photocatalyst component according to an embodiment.

FIG. 2 shows a schematic of a gas treatment system 34 for treating the gas stream 12 carried in the gas conduit 14 with hydroxyl radicals supplied by a gas conduit 36 having an inlet 38 and outlet 40 which supplies the hydroxyl radicals to the gas conduit 14 through the secondary inlet 24. In this embodiment, a gas treatment unit 42 can form the hydroxyl radicals from at least a partial pressure of water vapor in a gas stream 44 driven through the gas conduit 36 by a gas moving component 46. As shown in FIG. 2, the gas treatment unit 42 can be integrated within the gas conduit 36. For example, in one embodiment, the gas treatment unit 42 can be integrated within a radiative chamber 47 formed in the gas conduit 36. It is understood that the gas treatment unit 42 can also be separate from the gas conduit 36. For example, the gas treatment unit 42 could include its own radiative chamber that contains various elements that operate cooperatively in the formation of the hydroxyl radicals. To this extent, the gas treatment unit 42 can couple the outlet 40 of the gas conduit 36 to the secondary inlet 24 of the gas conduit 14.

As used herein, at least a partial pressure of water vapor in a gas stream means a pressure of water vapor that maintains a relative humidity greater than 20%. In one embodiment, the gas stream 44 driven though the gas conduit 36 by the gas moving component 46 can include air. It is understood that other gases can be directed through the gas conduit 36 to form the hydroxyl radicals including, but not limited to, hydroperoxyl, oxygen, and hydrogen.

In one embodiment, the gas moving component 46 can include a propeller device such as a fan or similar device that utilizes an airfoil-shaped blade that converts rotational motion into a thrusting motion that moves a gas or liquid in a specific direction. To this extent, the propeller device causes the gas stream 44 to travel through the gas conduit 36 at a gas flow velocity and gas pressure that is sufficient to enter the secondary inlet 24 of the gas conduit 14 and interact with the gas stream 12 containing the VOCs.

The gas treatment unit 42 can include a photocatalyst component 48 configured to receive the gas stream 44 driven through the gas conduit 36 by the gas moving component 46, and at least one ultraviolet radiation source 50 configured to irradiate the photocatalyst component with ultraviolet radiation. As used herein, a photocatalyst component means a structure including a material having a photocatalytic surface. Such a photocatalytic surface can be capable of reacting with ultraviolet radiation (e.g., absorbing some ultraviolet radiation) and generates hydroxyl radicals in the presence of gases containing oxygen and hydrogen. Alternatively, a photocatalytic surface can be capable of absorbing light, producing electron-hole pairs that enable chemical transformations of the reaction participants and regenerate its chemical composition after each cycle of such interactions.

In addition to titanium dioxide, examples of photocatalytic materials include metal oxides, such as oxides of vanadium, chromium, titanium, zinc, tin, and cerium, which follow similar primary photocatalytic processes such as light absorption, which induces a charge separation process with the formation of positive holes that are able to oxidize organic materials. In this process, a metal oxide can be activated with UV light, visible light, or a combination of both, and photo-excited electrons are promoted from the valence band to the conduction band, forming an electron/hole pair (e−/h+). The photo-generated pair (e−/h+) is able to reduce and/or oxidize a compound adsorbed on the photocatalyst surface.

The photocatalytic activity of a metal oxide comes from two sources: (i) generation of OH radicals by oxidation of OH— anions, and (ii) generation of $O_2$— radicals by reduction of $O_2$. Both the radicals and anions can react with pollutants to degrade or otherwise transform the pollutants to less harmful byproducts. To this extent, the irradiated photocatalyst component 48 disassociates the gas containing water vapor for formation of the hydroxyl radicals in proximity to the photocatalyst component 48.

In one embodiment, the photocatalyst component 48 can be coated or constructed with catalytic metals and/or catalytic oxides. Examples of catalytic metals can include, but are not limited to, Fe(II), Cr(II), Pt black and Pd, while examples of catalytic oxides can include, but are not limited to, $TiO_2$, FeO, $Fe_2O_3$, $Fe_3O_4$, $MnO_2$ and $MoO_2$. In one embodiment, the photocatalyst component 48 can be coated or constructed with nano-sized $TiO_2$ sol gel particles.

In one embodiment, as shown in FIG. 2, a set of ultraviolet radiation sources 50 can irradiate the photocatalyst component 48 with ultraviolet radiation. The set of ultraviolet radiation sources 50 can comprise any combination of one or more ultraviolet radiation emitters. Examples of ultraviolet radiation emitters can include, but are not limited to, high intensity ultraviolet lamps (e.g., high intensity mercury lamps), discharge lamps, ultraviolet light emitting diodes (UV LEDs), super luminescent LEDs, laser diodes, and/or the like. In one embodiment, the set of ultraviolet radiation sources 50 can include a set of LEDs manufactured with one or more layers of materials selected from the group-III nitride material system (e.g., $Al_xIn_yGa_{1-x-y}N$, where 0≤x, y≤1, and x+y≤1 and/or alloys thereof). Additionally, the set of ultraviolet radiation sources 50 can comprise one or more additional components (e.g., a wave guiding structure, a component for relocating and/or redirecting ultraviolet radiation emitter(s), etc.) to direct and/or deliver the emitted radiation to a particular location/area (e.g., to a surface of the photocatalyst component 48), in a particular direction, in a particular pattern, and/or the like. Illustrative wave guiding structures include, but are not limited to, a wave guide, a plurality of ultraviolet fibers, each of which terminates at an opening, a diffuser, and/or the like.

It is understood that the number of ultraviolet radiation sources 50 illustrated in FIG. 2 and the other various embodiments described herein is only illustrative. Those skilled in the art will appreciate that any number of ultraviolet radiation sources 50 may be located within the gas conduit 36. For example, the gas conduit 36 can have only one ultraviolet radiation source 50 or multiple ultraviolet radiation sources 50 can be located at the same position along a surface of an inner wall 52 of the conduit 36 or at varying locations along the inner wall.

In one embodiment, the ultraviolet radiation source 50 or multiple ultraviolet radiation sources 50 can be located on the exterior walls of the gas conduit 36 such that at least a portion of the set of ultraviolet radiation sources can be air-cooled by the exterior environment. For example, the ultraviolet radiation sources 50 can be positioned along the exterior walls at locations having ultraviolet transparent, chemically impenetrable windows that pass the emitted radiation into the gas conduit 36. The ultraviolet transparent windows can include a fluoropolymer material, which in general, has a high transparency to ultraviolet light. Examples of an ultraviolet transparent fluoropolymer material can include, but are not limited to, fluorinated ethylene propylene co-polymer (EFEP), fluorinated ethylene propylene (FEP), polytetrafluoroethylene (PTFE), ethylene chlorotrifluoroethylene (ECTFE), polychlorotrifluoroethylene (PCTFE), perfluoroalkoxy (PFA), polyvinylidene fluoride (PVDF), ethylene tetrafluoroethylene (ETFE), tetrafluoroethylene hexafluoropropylene vinylidene fluoride co-polymer (THV), low density polyethylene (LDPE), perfluoro methyl alkoxy (MFA), and/or the like. While primarily described in conjunction with fluoropolymers, it is understood that other comparable materials can be utilized such as polylactide (PLA), fused silica, sapphire, THE, and/or the like.

In one embodiment, the ultraviolet radiation source 50 or multiple ultraviolet radiation sources 50 can be located between the inner walls 52 and the exterior walls of the gas conduit 50, which can be ultraviolet impenetrable from the outside (e.g., ultraviolet absorbing material), and configured to direct ultraviolet radiation through a respective ultraviolet transparent window into the gas conduit 36 towards the photocatalyst component 48. In one embodiment, the set of ultraviolet radiation sources 50 can be encapsulated from the gas stream 44 in the gas conduit 36 by ultraviolet transparent media, including but not limited to, a fluoropolymer, $SiO_2$, $Al_2O_3$, $CaF_2$, $MgF_2$, and/or the like. In particular, the light emitting diodes can be hermetically separated from a gas stream, and provide radiation into the gas stream through a set of ultraviolet transparent surfaces that can be configured as windows.

In an embodiment the light emitting diodes are installed adjacent to inner walls of the chamber. In an embodiment, the inner walls can contain cavities of sufficient depth to host light emitting diodes, with the appropriate wiring provided from within the inner walls. Such cavities with wiring can comprise sockets installed within the inner walls. Each socket can further comprise an ultraviolet transparent outer surface capable of encapsulating a light emitting diode contained within the socket from the outside gas stream. In an embodiment, the ultraviolet transparent windows and sockets are configured as to not overheat the light emitting diode contained within, e.g., with a back part of the socket possibly containing a heatsink for removing heat as known in the art of heat transfer.

The ultraviolet radiation sources 50 can be configured to operate at a number of wavelengths. For example, in one embodiment, the ultraviolet radiation sources 50 can be configured to operate at a wavelength that ranges from about 230 nm to about 390 nm, with 340 nm to 380 nm being a preferred range. Emission of ultraviolet light within these ranges for a predetermined time period can be sufficient to enable an irradiated photocatalyst component 48 to disassociate the gas stream 44 into hydroxyl radicals with sufficient density and concentration levels that are supplied into the secondary inlet 24 to react with the gas stream 12 in the gas conduit 14 to reduce the presence of VOCs that are released out of the outlet 26.

In one embodiment, the ultraviolet radiation sources 50 can be configured to function in a coordinated manner. For example, the ultraviolet radiation sources 50 can operate at the same wavelengths and intensities for the same duration, or the sources can operate at different wavelengths and/or intensities for varying durations. In one embodiment, groups of ultraviolet radiation sources 50 can operate at distinct target wavelengths and intensities to facilitate a pulsed mode irradiation of the photocatalyst component 48. For example, a first group of ultraviolet radiation sources 50 can be configured to produce a first burst of ultraviolet radiation and a second group of ultraviolet radiation sources 50 can be configured to produce a second burst of ultraviolet radiation. In this manner, the ultraviolet radiation sources 50 can direct high powered pulses (e.g., 0.1-2 watt pulses) of ultraviolet radiation to the photocatalyst component 48. This is beneficial because high pulses can provide adequate disinfection without overheating the light emitting diodes.

In order to recycle or recirculate the ultraviolet radiation emitted from the ultraviolet radiation sources 50, all or a portion of surfaces of the inner wall 52 of the gas conduit 36 can have an ultraviolet reflective layer or material. In one embodiment, one or more regions of the ultraviolet reflective layer or material can have a reflectivity of at least 30% to enable recycling of the ultraviolet radiation generation from the ultraviolet radiation sources 50. In one embodiment, the ultraviolet reflective layer can include a diffusive ultraviolet reflective layer. The diffusive ultraviolet reflective layer or material can include a coating or thin film of a fluoropolymer. Examples of a fluoropolymer that are suitable as an ultraviolet reflective layer or material that enables diffusive reflectivity can include, but are not limited to, expanding polytetrafluoroethylene (ePTFE) membrane (e.g., GORE® DRP® Diffuse Reflector Material), polytetrafluoroethylene (PTFE), and/or the like.

The photocatalyst component 48 can be positioned at a predetermined distance from the outlet 40 of the second gas conduit 36 in order to attain a predetermined density and concentration levels of hydroxyl radicals at the secondary inlet 24 of the gas conduit 14 after the gas stream passes through the irradiated photocatalyst within a predetermined time (e.g., at most, within a half of a second). In one embodiment, the photocatalyst component 48 is positioned at a predetermined distance, which can be determined by experimentation. Since the hydroxyl radicals are extremely reactive, it is understood that the density level and the concentration of the hydroxyl radicals at the secondary inlet 24 of the gas conduit 14 will decrease as the distance spacing between the photocatalyst component 48 and the inlet 24 increases.

The gas treatment unit 42 can utilize other hydroxyl radical enhancing modalities to complement the production of hydroxyl radicals by the photocatalyst component 48 and the set of ultraviolet radiation source 50. For example, a heater, heat exchanger, or the like, can be used to increase the temperature of the gas stream 44 driven in the gas conduit 36 by the gas moving component 46 towards the secondary inlet 24 of the gas conduit 14. In this manner, the irradiated photocatalyst 48 can form an increased density and concentration level of the hydroxyl radicals for supply to the gas conduit 14.

In addition to the separation distance between the photocatalyst component 48 and the secondary inlet 24 of the gas conduit 14, other hydroxyl formation parameters can be specified and/or adjusted to attain a desired density and concentration level of hydroxyl radicals at the secondary inlet 24. A non-exhaustive listing of hydroxyl formation parameters that can be specified and/or adjusted to attain a desired density and concentration level of hydroxyl radicals includes a density of the water vapor in the gas stream 44, the flow speed and pressure of the gas stream 44 in the gas conduit 36 due to the gas moving component 46 driving the gas stream through the conduit in order to have the desire hydroxyl radical levels enter the gas conduit 14 within the predetermined time setting, the temperature of the gas stream 44 in the gas conduit 36, and the radiation intensity that the ultraviolet radiation sources 50 irradiate the photocatalyst component 48. It is understood that other thermodynamic properties of the gas stream 44 in the gas conduit 36 (e.g., volume) can have a role in the formation of the hydroxyl radicals that are supplied to the gas conduit 14 via the secondary inlet 24.

These hydroxyl formation parameters can be specified in a number of different combinations that will result in the desired density and concentration level of hydroxyl radicals (e.g., at least 30% density level) supplied to the secondary inlet 24 of the gas conduit 14. In an embodiment, a water vapor level in the gas stream 44, a gas flow speed, a gas stream pressure, a gas temperature, and a radiation intensity can all be determined based on design parameters and/or experimentally to facilitate hydroxyl radical production at a desired level that can reduce VOCs from the gas stream 12 in the gas conduit 14.

The gas treatment unit 42 can utilize a control unit 54 to specify any of the hydroxyl formation parameter settings and at least one sensor 56 located about the second conduit 36 to attain operational data pertaining to any of these parameters. To this extent, the control unit 54 can control or manage the hydroxyl radical production and the density and concentration levels of the radicals that is fed into the gas conduit 14 based on the detected data. In one embodiment, the control unit 54 can be located on the exterior of the gas treatment unit 42 or the gas conduit 36, and can be operatively coupled with a set of sensors 56 positioned at various locations on the inner wall of the gas conduit 36. In operation, the set of sensors 56 can generate signals representative of the conditions that each is configured to detect that relates to one of the hydroxyl formation parameters, and send those signals to the control unit 56, which can adjust settings of any of the parameters according to feedback provided by the sensors to ensure that a desired density and concentration level of hydroxyl radicals is supplied to the gas conduit 14.

In one embodiment, the control unit 54 can activate the operation of the ultraviolet radiation sources 50 in response to a user (human or another system) selection indicating the desire to begin a gas treatment on the gas stream directed through the gas conduit 14. Activating the operation of the ultraviolet radiation sources 50 by the control unit 54 can include specifying any of a plurality of irradiation parameters. In one embodiment, the plurality of irradiation parameters can include, but are not limited to, a wavelength of the ultraviolet radiation emitted from the ultraviolet radiation sources 50, an intensity or dosage of the ultraviolet radiation delivered to the gas stream 44 and the photocatalyst component 48 by the ultraviolet radiation sources 50, and a treatment time that the ultraviolet radiation sources 50 deliver the ultraviolet radiation to the gas stream 44 and the photocatalyst component 48. Other irradiation parameters can include an angular distribution of the ultraviolet radiation transmitted from the ultraviolet radiation sources 50, a power setting for operating the ultraviolet radiation sources 50, and a maximum operating temperature for the irradiation. It is understood that these irradiation parameters are illustrative of some of the parameters that can be set by the control unit 54 and is not meant to be limiting as other parameters exist which may be specified.

The sensors 56 can include any of a number of different sensors that can detect operational data pertaining to any of the hydroxyl formation parameters. For example, the sensors 56 can include one or more of the following sensors: a humidity sensor, a temperature sensor, a pressure sensor, and a gas flow sensor. Each of these sensors can detect a level or amount of a particular parameter that each is intended to measure and send signals thereof to the control unit 54. For example, a humidity sensor can detect the water vapor in the gas stream 44, a temperature sensor can detect the temperature of the gas stream 44 in the gas conduit 36, a pressure sensor can detect the gas pressure in the gas conduit 36, and a gas flow sensor can detect the flow of the gas driven through the gas conduit 36 by the gas moving component 46. The control unit 54 can use this data to control and manage the gas stream 44 (e.g., formation of hydroxyl radicals) by adjusting any of the hydroxyl formation parameters (e.g., gas flow, power of the gas moving component 46, the irradiation settings of the ultraviolet radiation sources 50, the temperature and pressure in the gas conduit 36) to attain a desired density and/or concentration level of hydroxyl radicals that is supplied to the gas conduit 14 at the secondary inlet 24 via the outlet 40 that is sufficient to reduce the presence of VOCs in the gas conduit 14 by a minimum/desired amount.

It is understood, that the aforementioned sensors are only examples of possible sensors that can be utilized with the gas treatment system 34, and those skilled in the art will recognize that other types of sensors can be used. In addition, it is understood that the configuration of the sensors 56 in FIG. 2 as well as the others figures are only illustrative of one implementation and are not meant to be limiting. For example, the gas conduit 14 could have a number of sensors to measure different parameters. In one embodiment, the gas conduit 14 can have a variety of chemical sensors to measure the types of chemicals present in the gas stream 12, the amount of VOCs at the inlet 22 and the outlet 26. It is understood that any of the sensors implemented in the gas conduit 14 could be operatively coupled to the control unit 54. To this extent, the control unit 54 can use any data from these sensors to manage the production of hydroxyl radicals by the gas treatment unit 42 that is supplied to the gas conduit 14. For example, sensors 56 located about the gas conduit 14 can obtain temperature and pressure measurements of the gas stream 12. The control unit 54 can make adjustments to the flow and pressure of the gas stream 44 in the gas conduit 36 in response to variations of the temperature and pressure of the gas stream 12 in the gas conduit 14.

In one embodiment, the control unit 54 can calibrate any of the hydroxyl formation parameters specified for a gas treatment to account for thermodynamic and chemical properties of the exhaust gas 12 in the gas conduit 14 as detected by any sensor located in the gas conduit 14. In particular, the control unit 54 can adjust an intensity, duration, wavelength, and/or the like, of the ultraviolet radiation, as well as variations of intensity and wavelength through time, to provide an appropriate hydroxyl level depending on a type of exhaust gas, the speed of the gas, and other gas parameters, such as temperature. Moreover, the control unit 54 can adjust the humidity levels depending on one or more attributes of the exhaust gas. In addition, the control unit 54 can determine that a photocatalytic surface requires cleaning, e.g., either by utilizing sensors that evaluate the cleanliness of the photocatalytic surface (such as a visible camera, for example) or through determining time spent using the photocatalytic surface. Regardless, the control unit 54 can indicate to a user that a photocatalytic surface requires cleaning using any solution.

The control unit 54 can include a timer with switches and/or the like, to manage the duration that the ultraviolet radiation sources 50 are on for a particular irradiation of the photocatalyst component 48. In one embodiment, the control unit 54 operating in conjunction with the timer can manage the amount of time that the ultraviolet radiation sources 50 radiate the photocatalyst component 48 and the gas stream 44 in the UV-C range versus the UV-B range. The duration and frequency treatment that the ultraviolet radiation sources 50 are utilized can depend on detected condition signals provided to the control unit 54 by any of the sensors.

During operation of a gas treatment by the gas treatment unit 42, the control unit 54 can be used to control at least one of the aforementioned plurality of irradiation parameters (e.g., wavelengths, intensities, and durations and/or the like) associated with the ultraviolet radiation emitted from the ultraviolet radiation sources 50. In one embodiment, the control unit 54 can control the wavelength of ultraviolet radiation and intensity spatially over a surface of the photocatalyst component 48 that receives the gas stream 44. As an example, the control unit 54 can control the ultraviolet radiation sources 50 to operate at a target wavelength and intensity for a duration that is designed to generate a maximum amount of hydroxyl radicals.

In an embodiment, the control unit 54 can determine a target intensity for radiation to be directed to the photocatalyst component 48. The intensity range can be determined based on attributes of the ultraviolet radiation sources 50. The target intensity can be incremented in steps or continuously over the range of times corresponding to the varying intensities.

In an embodiment, the control unit 54 can generate outputs for presentation to a user that correspond to the gas treatments (e.g., hydroxyl radical formation, density and concentration levels, and VOCs levels). The outputs can be transmitted to a human user via a number of different output devices that can include, for example, a vibration device, a visible light (e.g., flashing), an auditory signal generated by a speaker, and/or the like, and/or to a system user via any type of messaging solution.

In addition, during the operation of a gas treatment, the control unit 54 can be used to turn on or off the ultraviolet radiation sources 50 dependent upon the detected conditions provided by the sensors 56. In one embodiment, the control unit 54 can turn on or off each of the ultraviolet radiation sources 50 via an actuator. Also, the control unit 54 can be used to adjust one or more of the ultraviolet radiation characteristics based on the conditions detected by the sensors 56. For example, the control unit 54 can use the signals from a humidity sensor to adjust the intensity, the wavelength, the duration and or the pattern of the ultraviolet radiation emitted from any of the ultraviolet radiation sources 50 to achieve a desired density and concentration level of hydroxyl radicals that is fed into the gas conduit 14. In another embodiment, the control unit 54 can be configured to interrupt the operation of the ultraviolet radiation sources 50 in response to receiving temperature signals from a temperature sensor and determining that the temperature of the gas treatment has exceeded the maximum temperature.

The control unit 54 can also include a wireless transmitter and receiver that is configured to communicate with a remote location via Wi-Fi, BLUETOOTH, and/or the like. As used herein, a remote location is a location that is physically apart from the gas treatment system 34 including the gas treatment unit 42. For example, a remote computer can be used to transmit operational instructions to the wireless transmitter and receiver. The operational instructions can be used to program functions performed and managed by the control unit 54. In another embodiment, the wireless transmitter and receiver can transmit gas treatment results to the remote computer, to facilitate maintenance and diagnostic operations on the ultraviolet cleaning treatment system.

The control unit 54 can include an input component and an output component to allow a user to interact with the gas treatment system 34 and the control unit 54, and to receive information therefrom. In one embodiment, the input component can permit a user to adjust at least one of the aforementioned plurality of hydroxyl formation parameters. This can include making adjustments during the gas treatment operation and/or prior to initiating a treatment. In one embodiment, the input component can include a set of buttons and/or a touch screen to enable a human user to specify various input selections regarding the hydroxyl formation parameters as well as the gas treatment (e.g., irradiation parameters) and/or an application program interface and communications device that enables a system user to specify various input selections. In one embodiment, the output component can include a visual display for providing status information on the gas treatment (e.g., amount VOCs released, hydroxyl radical levels or the like), and a simple visual indicator that displays whether a gas treatment is underway (e.g., an illuminated light) or if the treatment is over (e.g., absence of an illuminated light) to a human user and/or an application program interface and communications device that communicates data to a system user.

The gas treatment system 34 can further include a power source that is configured to power each of the ultraviolet radiation sources 50, the control unit 54, the sensors 56, and the gas moving component 46. In one embodiment, the power source can take the form of one or more batteries, a vibration power generator that can generate power based on magnetic inducted oscillations or stresses developed on a piezoelectric crystal. In another embodiment, the power source can include a super capacitor that is rechargeable. Other power components that are suitable for use as the power source for the gas treatment system 34 including the ultraviolet radiation sources 50, the control unit 54, the sensors 56, and the gas moving component 46 can include a mechanical energy to electrical energy converter such as a piezoelectric crystal, and a rechargeable device.

The gas treatment system 34 can also include a heat dissipating component. A heat dissipating component enables the electronic componentry associated with the ultraviolet radiation sources 50, the control unit 54, the sensors 56, the gas moving component 46 and the power source to operate efficiently without overheating. Examples of a heat dissipating component can include, but are not limited to, a heat sink, an air fan, and/or other heat dissipating mechanisms, such as liquid heating.

Figure 8:
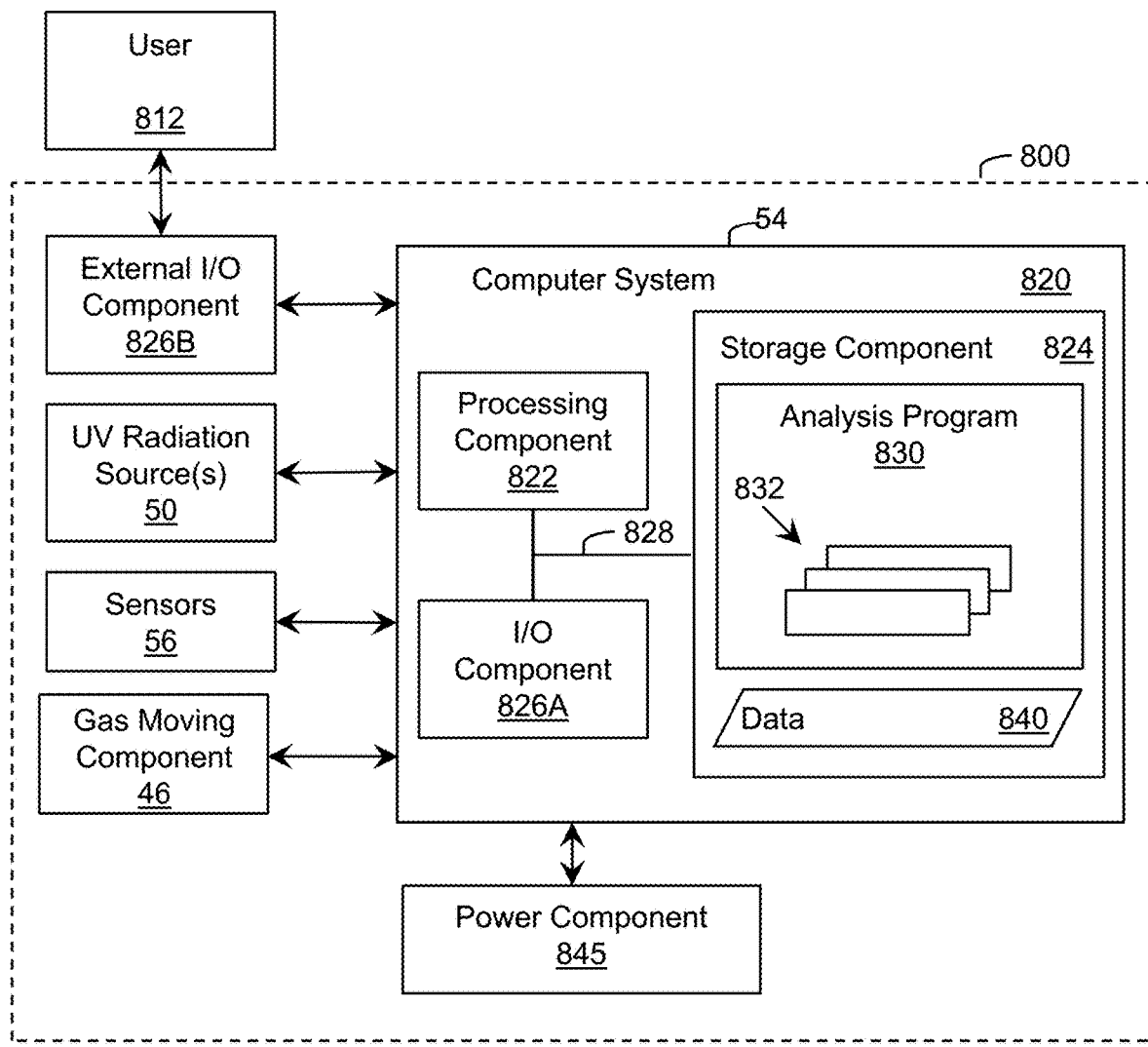
FIG. 8 shows a schematic block diagram representative of an overall processing architecture of a gas treatment system that is applicable to any of the systems describe herein according to an embodiment.

The aforementioned components of the gas treatment system are illustrated in FIG. 8 and discussed further with regard to this figure. These components of the gas treatment system are suitable for use with the various other gas treatment systems described herein. It is understood that the functions of these components can vary and will depend on the type of the gases, the conduits used to carry the gases, and the combustible processes in which the system is deployed. Thus, the functions described are only illustrative of examples of particular functions and operations to be performed and are not meant to be limiting to the embodiment of FIG. 2 as well as to the gas treatment systems used in conjunction with the other embodiments described herein.

The photocatalyst component 48 can be implemented in a gas treatment system in one of a number of configurations within a gas conduit that operate cooperatively with one or more radiation sources 50 to effectuate a catalytic reaction with a stream of gas for production of hydroxyl radicals. As shown in FIG. 2, the photocatalyst component 48 can be positioned within the stream of gas 44 flowing through the gas conduit 36 such that the ultraviolet radiation sources 50 are upstream of the photocatalyst component. In one embodiment, the photocatalyst component 48 can include at least two commonly-shaped elements coated with one of the aforementioned materials that are placed within the stream of gas 44. For example, the photocatalyst component 48 can include at least two elliptical-shaped elements (i.e., cylindrical with a small height) that each conform to the cross-sectional area of the gas conduit 36 such that the elliptical-shaped elements are positioned within the full flow of the gas stream 44. In one embodiment, the elliptical-shaped elements can be formed of an elastomeric material that allows the elements to conform to the cross-sectional area of the gas conduit 36. With this configuration, the gas flowing around photocatalyst will acquire hydroxyl radicals which can be used for eliminating VOC components in exhaust gases. It is understood that the elements that form the photocatalyst component 48 can have other shapes besides elliptical (e.g., circular) shapes. It is understood that the selection of a particular shape for the photocatalyst elements can depend on the shape of the gas conduit used in a particular gas treatment system.

Figure 3:
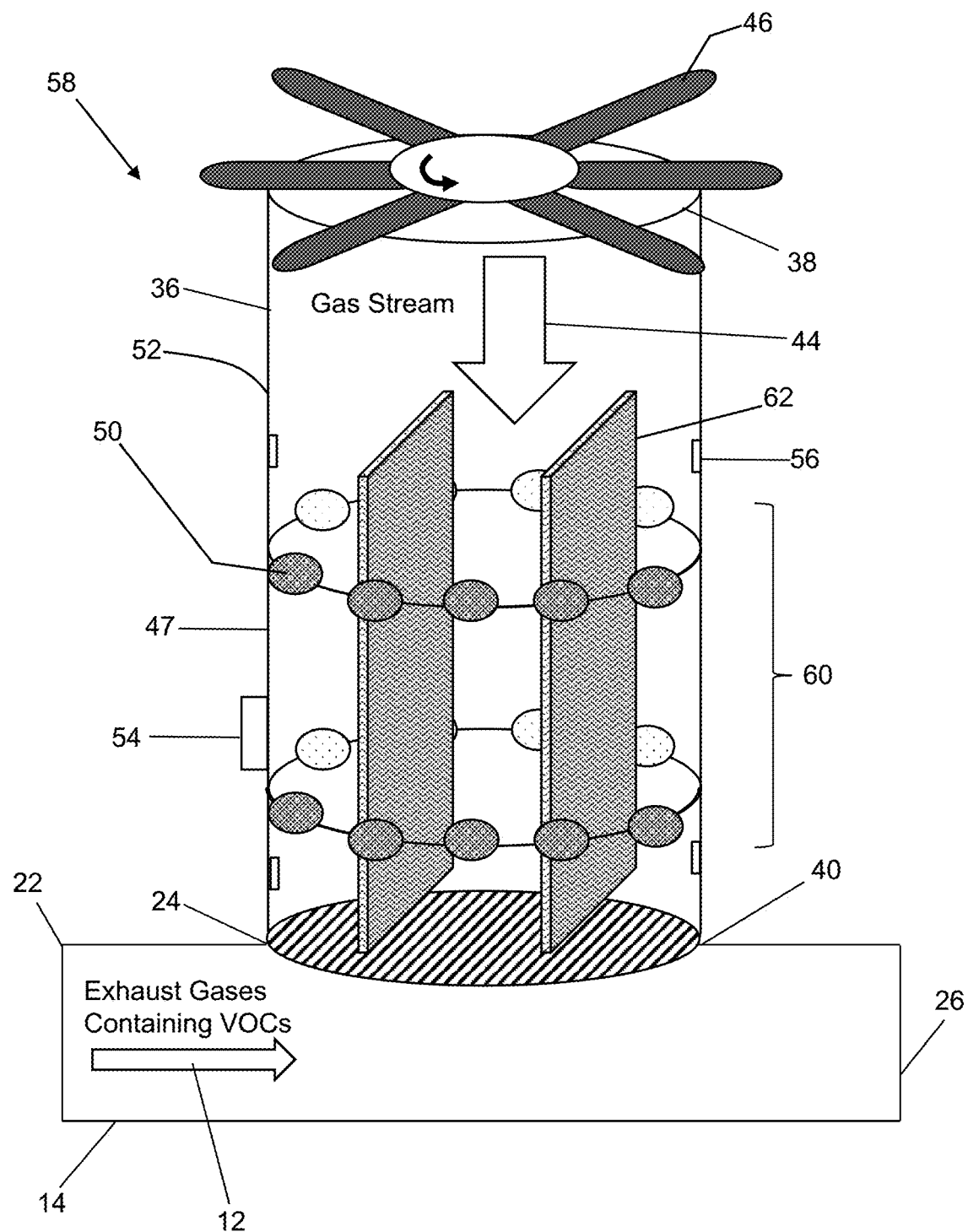
FIG. 3 shows a schematic of a gas treatment system for treating a gas stream carried in a first gas conduit with hydroxyl radicals supplied by a second gas conduit having a photocatalyst component formed from two commonly-shaped elements spaced apart within a stream of gas carried by the second gas conduit and surrounded by a set of ultraviolet radiation sources according to an embodiment.

FIG. 3 shows a schematic of a gas treatment system 58 having a gas treatment unit 60 in the gas conduit 36 that includes an alternative ultraviolet radiation source and photocatalyst component configuration. As shown in FIG. 3, the gas treatment unit 60 includes a photocatalyst component 62 formed from commonly-shaped elements located centrally with respect to the stream of gas 44 flowing through the gas conduit 36. In one embodiment, the commonly-shaped elements of the photocatalyst component 62 include rectangular-shaped elements (i.e., a rectangular cuboid with one small dimension) coated with one of the aforementioned materials situated in the stream of gas 44, wherein the elements are separated apart from each by a predetermined distance. FIG. 3 shows that the set of ultraviolet radiation sources 50 are positioned on the inner walls 52 of the gas conduit 36, encircling the rectangular-shaped elements of the photocatalyst component 62. Having the ultraviolet radiation sources 50 encircle the spaced rectangular-shaped elements of the photocatalyst component 62 in this manner allows for improved irradiation of the surfaces of photocatalysts.

It is understood that other shapes besides rectangular shapes can be used for the spaced elements of the photocatalyst component 62 in the gas treatment unit 60 of the gas treatment system 58. For example, any shapes such as for example, rods, cylinders of small cross-section, as well as suspended mesh, either along or across the gas flow, with the mesh surface comprising a photocatalyst, that have a lateral area that permit irradiation by the ultraviolet radiation sources 50 in a reasonably uniform way within the gas conduit 36 are possible options.

Figure 4:
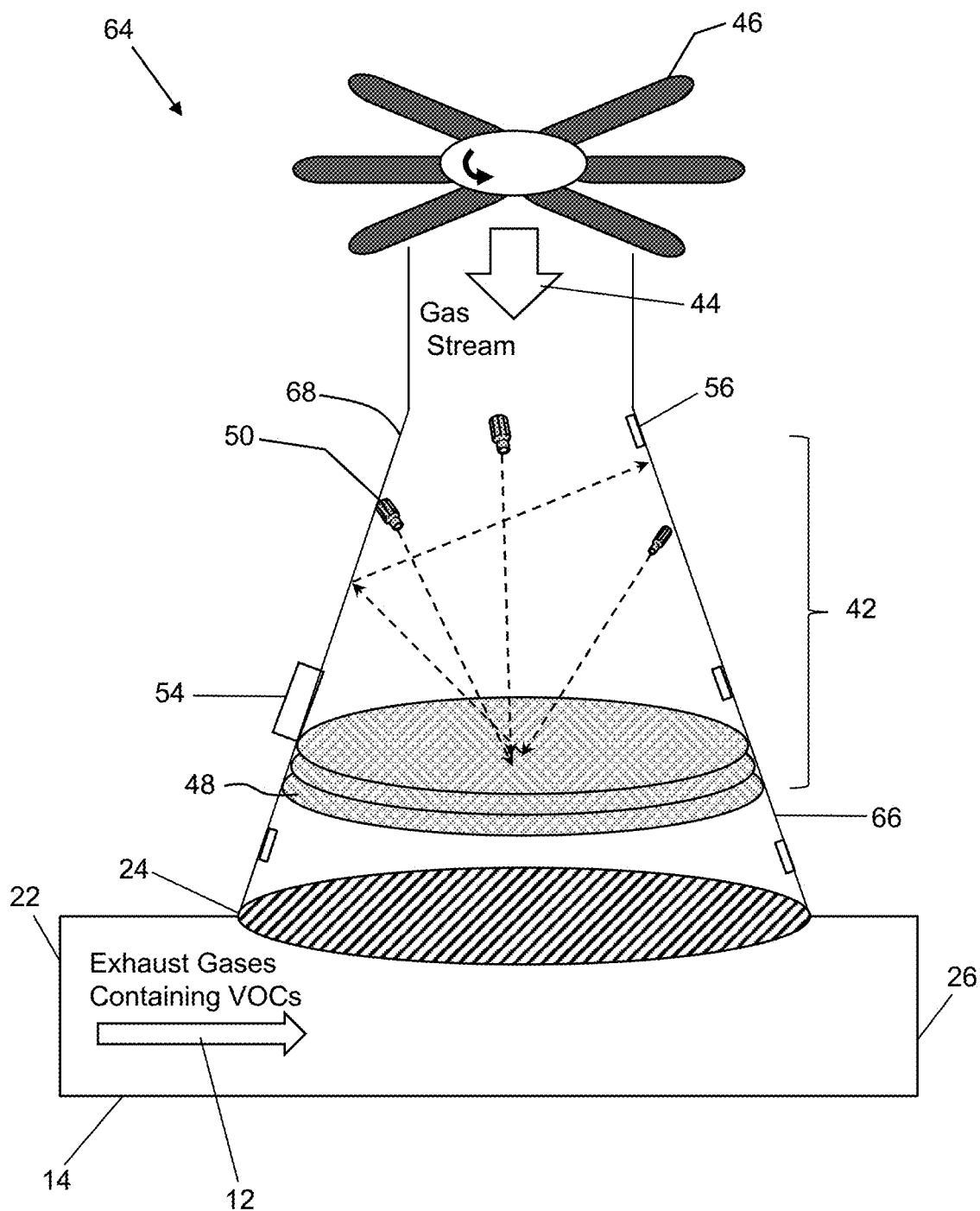
FIG. 4 shows a schematic of a gas treatment system for treating a gas stream carried in a first gas conduit with hydroxyl radicals supplied by a second gas conduit having a conical expanding-shaped radiative chamber with a set of ultraviolet radiation sources and a photocatalyst component according to an embodiment.

The gas treatment units that are used with any of the gas treatment systems described herein can be configured with a shape that enhances recycling of ultraviolet radiation generated from the ultraviolet radiation sources 50 and the photocatalytic effect of the photocatalyst component. FIG. 4 shows a schematic of a gas treatment system 64 having a gas treatment unit 42 including a photocatalyst component 48 and a set of ultraviolet radiation sources 50 as discussed above with regard to FIG. 2, except that these elements are located in a conical expanding-shaped radiative chamber 66 that is coupled to the secondary inlet 24 of the gas conduit 14. The conical expanding-shaped radiative chamber 66 enhances recycling of ultraviolet radiation generated from the set of ultraviolet radiation sources 50 due to possible reflections from the chamber walls. For such a configuration, the chamber walls have some portion of surfaces that include reflective or partially reflective material that can comprise aluminum, fluoropolymer, $SiO_2$ with evaporated aluminum, $Al_2O_3$, ePTFE, and/or the like. The enhancement of both the recycling of ultraviolet radiation and the photocatalytic effect of the photocatalyst component 48 allow greater density and concentration level of hydroxyl radicals to enter the secondary inlet 24 of the gas conduit 14.

It is understood that the conical expanding-shaped radiative chamber 66 is only an example of one possible shape that a radiative chamber of a gas treatment unit of any of the various embodiments described herein can have and is not meant to be limiting. Those skilled in the art will appreciate that other shapes including simple shapes and complex shapes with large surfaces can be used to form a radiative chamber in any of the various gas treatment units in order to improve ultraviolet radiation cycling, the photocatalytic effect, and the formation and delivery of hydroxyl radicals to a gas conduit in order to remove the presence of VOCs.

Figure 5:
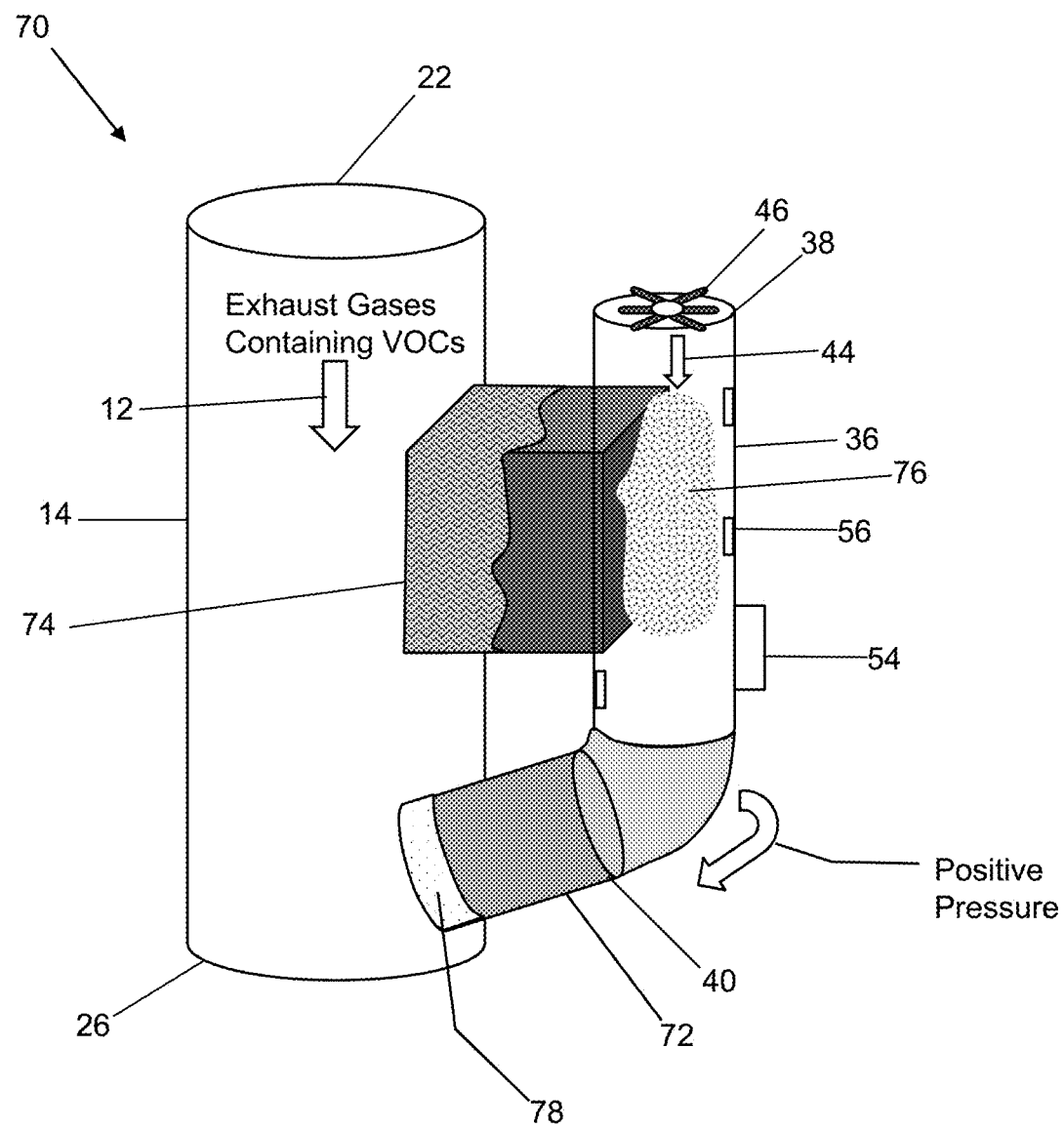
FIG. 5 shows a schematic of a gas treatment system for treating a gas stream carried in a first gas conduit with hydroxyl radicals supplied by a second gas conduit via a gas treatment unit having a photocatalyst component and at least one ultraviolet radiation source, with a water storage unit to impart a partial pressure of water vapor in the gas stream driven through the second gas conduit by a gas moving component, while utilizing a sod filtering unit to prevent sod from entering the gas treatment unit and the second gas conduit according to an embodiment.

FIG. 5 shows a schematic of a gas treatment system 70 for treating the gas stream 12 carried in the gas conduit 14 with hydroxyl radicals supplied by the gas conduit 36 via a gas treatment unit 72 having a photocatalyst component and at least one ultraviolet radiation source (both not shown in FIG. 5), with a water storage unit 74 to impart a partial pressure of water vapor 76 in the gas stream 44 driven through the gas conduit 36 by the gas moving component 46, while utilizing a sod filtering unit 78 to prevent sod from entering the gas treatment unit 72 and the gas conduit 36. In this embodiment, the gas treatment unit 72 is a separate unit that can be coupled to the outlet of the gas conduit 36 and the secondary inlet 24 (not depicted in FIG. 5) of the gas conduit 14 to provide hydroxyl radicals that reduce the presence of VOCs in the gas stream 12. As noted above, it is understood that the gas treatment unit 72 can be integrated within the gas conduit 36 such that the outlet 40 is connected directly to the secondary inlet of the gas conduit 14. Also, although this embodiment shows the gas treatment system 70 utilizing the gas treatment unit 72 in conjunction with both the water storage unit 74 and the sod filtering unit 78, it is understood that this embodiment is only illustrative of one particular configuration of a system as is not meant to be limiting to use with these components. Those skilled in the art will appreciate that the gas treatment system 70 like all of the other various systems described herein can be implemented with any combination of the different components described herein that complement the reduction of VOCs in a gas stream.

In one embodiment, the water storage unit 74 can be formed between the gas conduit 14 and the gas conduit 36. In this manner, the exhaust gases 12 flowing through the gas conduit 14 can heat water in the water storage unit 74. As a result, the heated water in the water storage unit 74 can heat up the gas conduit 36. This causes the gas stream 44 in the gas conduit 36 to heat up as well, with a partial pressure of the water vapor 76 to form in the gas stream 44. With the gas moving component 46 directing the gas stream 44 towards the gas treatment unit 72 and the gas conduit 14, the gas treatment unit can then form the hydroxyl radicals from the water vapor 76 in the gas stream 44 in the aforementioned manner for supply to the gas conduit 14 to reduce the presence of the VOCs from gas stream 12 before release through the outlet 26. In one embodiment, the water storage unit 74 can abut the gas conduit 14 and the gas conduit 36. For example, the water storage unit 74 can adjoin the gas conduit 36 at a position that is upstream of the gas treatment unit 72, closer towards an end of the conduit 36 where the gas moving component 46 is applying a pressure and gas flow to the gas stream 44 that is sufficient to direct the stream towards the gas treatment unit 72 and the gas conduit 14.

In order to maintain appropriate levels of the water vapor 76 in the gas stream 44, the control unit 54 and at least one of the sensors 56 can operate in conjunction with each other to ensure that there is a predetermined level of water vapor 76 in the gas stream for production of the hydroxyl radicals. For example, a humidity or water vapor sensor and a temperature sensor could be deployed with the gas conduit 36 to detect the amount of the water vapor in the gas stream 44, while a temperature sensor could be utilized to ascertain the temperature of the gas stream in the gas conduit 36. The control unit 54 can receive signals from the humidity and temperature sensors representative of the detected conditions from each of the sensors. If the levels of the water vapor 76 in the gas stream 44 are not at a predetermined level, then the control unit 54 could increase the temperature of the water in the water storage unit 74 through the use of a heater (not shown in FIG. 5), and perhaps make modifications to the flow speed and pressure of the gas stream 44 by adjusting the gas moving component 46. The control unit 54 can continue with changes to the water temperature and gas pressure until the predetermined water vapor level is reached. After reaching the predetermined water vapor level, the control unit 54 can continue to monitor the water vapor, temperature, pressure levels in the gas conduit 36 as well as any other parameters (e.g., hydroxyl density and concentration levels, radiation intensities and wavelength of the source(s) irradiating the photocatalyst component, etc.) that can have a role in the production of hydroxyl radicals.

In one embodiment, the sod filtering unit 78 can be located about the secondary inlet of the gas conduit 14 and the portion of the gas treatment unit 72 that supplies the hydroxyl radicals into the gas conduit 14. To this extent, the sod filtering unit 78 can prevent sod in the gas conduit 14, which can include, but is not limited to, microparticles of gas, fluid, dirt or oil, from entering the gas conduit 36 and the gas treatment unit 70. Examples of a sod filter that are suitable for use in the gas treatment system 70 or any of the other systems described herein can include, but are not limited to, plastic or carbon filters.

In the embodiment depicted in FIG. 5, the sod filtering unit 78, the gas treatment unit 72, the gas conduit 36 and the gas moving component 46 maintain a positive pressure with respect to the gas conduit 14. That is, the sod filtering unit 78, the gas treatment unit 72, the gas conduit 36 and the gas moving component 46, have a greater collective pressure as compared to the pressure in the gas conduit 14. This ensures that there is no ingress of anything within the environment of the gas conduit 14 to the gas treatment unit 72 and the gas conduit 36 that can impact the production and supply of the hydroxyl radicals. In one embodiment, the pressure and temperature within the gas conduit 36 can be selected to provide adequate back pressure for the hydroxyl radicals (OH) to enter the secondary inlet of the gas conduit 14, and for the sod not to penetrate the gas conduit 36. This makes certain that the sod filtering unit 78, the gas treatment unit 72, the gas conduit 36, and the gas moving component 46 maintain the hydroxyl flow with an appropriate flow rate to ensure that the hydroxyl does not react prior to entering gas conduit 14. It is understood that this positive pressure with respect to the gas conduit 14 can be present in all of the various embodiments described herein and is not specific to the embodiment depicted in FIG. 5.

Figure 6:
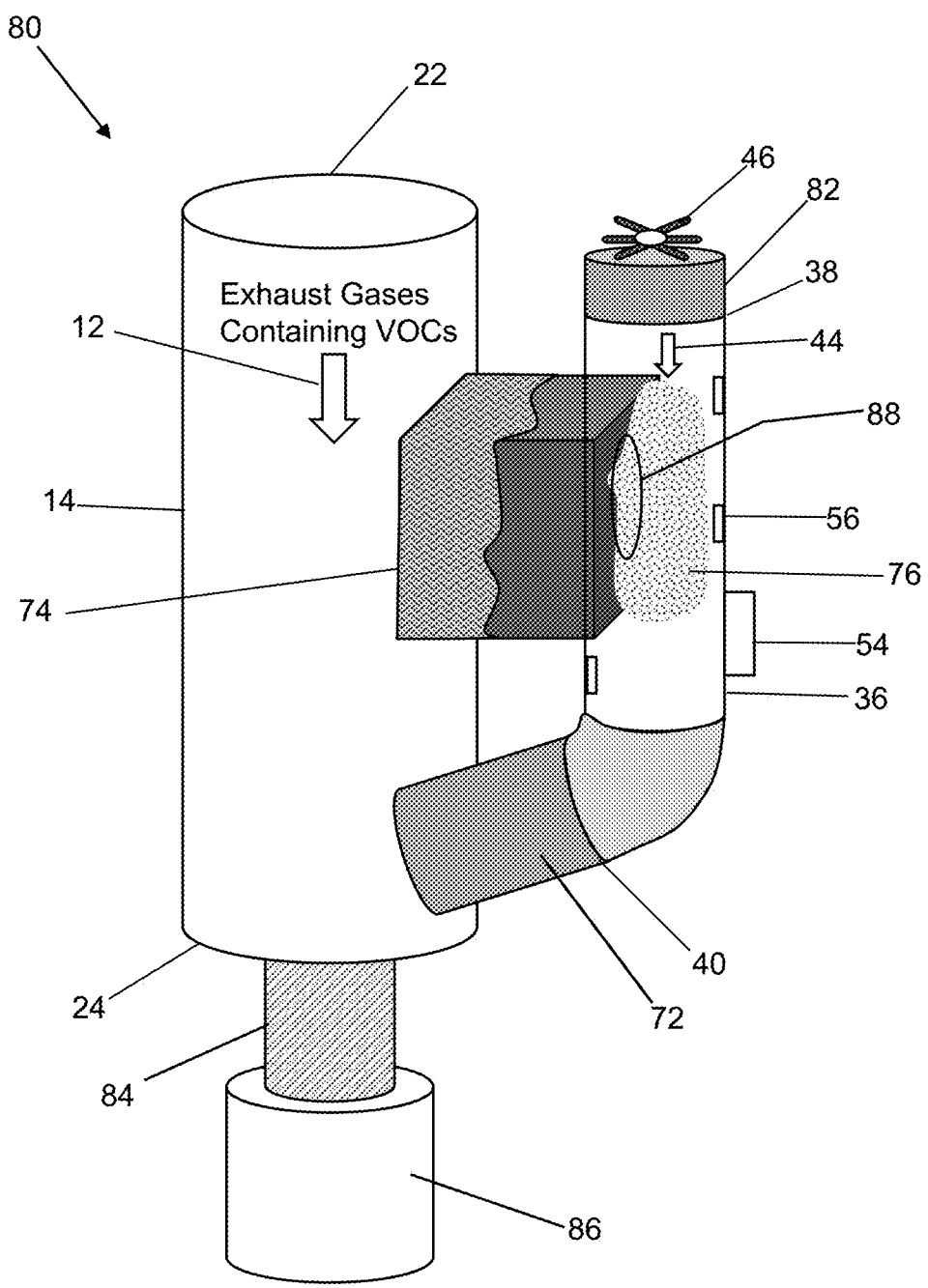
FIG. 6 shows a schematic of a gas treatment system similar to the one depicted in FIG. 5 without the sod filtering unit, but with an ozone generator to generate ozone in the gas stream carried by the second gas conduit, a plasma generator and a catalytic converter coupled to the outlet of the first gas conduit for scrubbing volatile organic compounds (VOCs) that remain in the gas stream in a first gas conduit after treatment with the hydroxyl radicals.

FIG. 6 shows schematic of a gas treatment system 80 similar to the one depicted in FIG. 5 without the sod filtering unit, but with an ozone generator 82 to generate ozone in the gas stream 44 carried by the gas conduit 36, a plasma generator 84 and a catalytic converter 86 coupled to the outlet 24 of the gas conduit 14 for scrubbing VOCs that remain in the gas stream 12 in the gas conduit 14 after treatment with the hydroxyl radicals. The embodiment depicted in FIG. 6 also shows that the water storage unit 74 can include a valve 88 that directs a flow of water from the water storage unit directly into the gas conduit 36 in order to impart the water vapor 76 in the gas stream 44 as opposed to relying on the gas stream 12 in the conduit 14 to heat the water and create the water vapor 76 in the conduit 36 by heat transfer as in FIG. 5. With this configuration, the control unit 54 can control the flow of water from the water storage unit 74 through the valve 88 into the gas conduit 36 as a function of the measure of the amount of water vapor in the gas stream 44 about the inlet 38 of the gas conduit 36 or from water vapor measurements obtained elsewhere such as in the proximity of the gas treatment unit 72.

As shown in FIG. 6, the ozone generator 82 can be located about the inlet 38 of the gas conduit 36 in order to generate ozone in the gas stream 44 that is driven along the gas conduit 36 to the gas treatment unit 72 and the gas conduit 14. For example, the ozone generator 82 can be located upstream of the gas treatment unit 72 which can include the photocatalyst component and at least one ultraviolet radiation source (both not shown in FIG. 6) to irradiate it. In this embodiment, the irradiated photocatalyst component in the gas treatment unit 72 (also contains at least one radiation source to irradiate the photocatalyst) can disassociate both the water vapor and the ozone in the second stream of gas, leading to an increased formation of the hydroxyl radicals. In general, ozone is an effective oxidizing agent and can be passed directly into a gas conduit in addition to hydroxyl radicals that are generated adjacent to photocatalytic surfaces. In some instances, ozone can be ionized adjacent to photocatalytic surfaces and become even more oxidizing. In other embodiments, ozone can react with other hydroxyl radicals to form a multitude of hydroxyl radicals in the vicinity of the photocatalyst.

Both the plasma generator 84 and the catalytic converter 86 can be coupled to the outlet 24 of the gas conduit 14 to act as scrubbing systems that aid in the reduction of VOCs from the gas stream 12 before release from the gas conduit 14 into the environment. In one embodiment, the plasma generator 84 and the catalytic converter 86 can reduce any presence of the VOCs that remain in the gas stream 12 after interaction with the hydroxyl radical supply fed into the gas conduit 14 by the gas treatment unit 72. In operation, the plasma generator 84 can be used to partially ionize the VOCs that remain in the gas stream 12 which results in an oxidizing reaction. This oxidizing reaction and the oxidizing reaction that can occur with any ozone that passes into the gas conduit 14 from the gas treatment unit 72 can reduce the presence of remaining VOCs from the gas stream 12. The catalytic converter 86, which can include any of the aforementioned systems, also operates to oxidize the VOCs from the gas stream 12 before release into the environment.

Figure 7A:
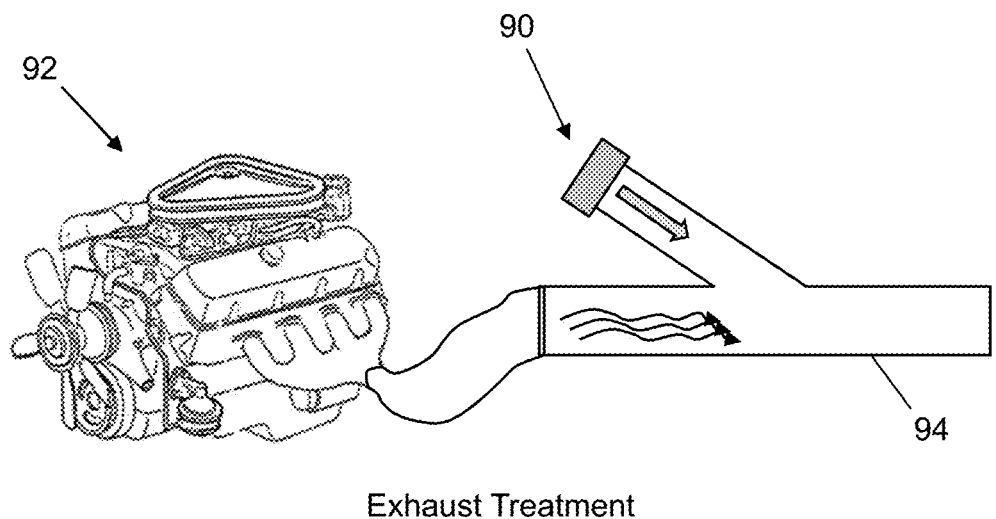
FIGS. 7A-7B show schematics of gas treatment systems according to one of the various embodiments described herein implemented with an internal combustion engine.
Figure 7B:
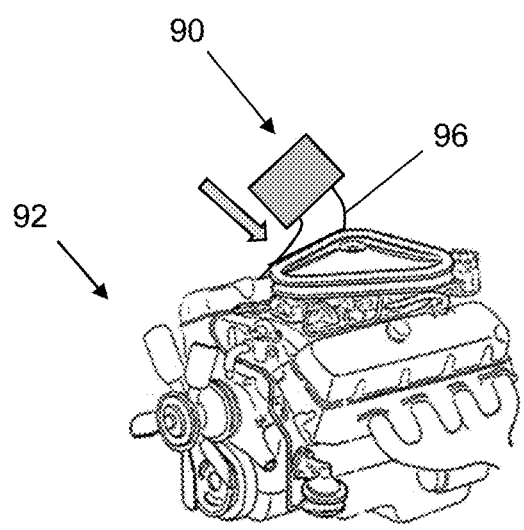

FIGS. 7A-7B show a couple of schematic examples of a gas treatment unit 90 which can include any one of the various embodiments described herein operating in use with an internal combustion engine 92 to remove VOCs from a gas stream. In particular, FIG. 7A illustrates that the gas treatment unit 90 can be used to provide an exhaust treatment that removes VOCs from an exhaust gas conduit 94 that carries exhaust gas emitted as result of the combustion of fuels in the internal combustion engine 92, while in FIG. 7B the gas treatment unit 90 can be used to provide a pre-burn treatment that removes VOCs from a gas supply conduit 96 that carries gas to the internal combustion engine 92 for combustion. In one embodiment, the gas treatment unit 90 of FIG. 7A can be configured to produce and deliver hydroxyl radicals in the aforementioned manner to the exhaust gas conduit 94 that can reduce the presence of the VOCs from the exhaust before release into the environment. In FIG. 7B, the gas treatment unit 90 can be configured to produce and deliver hydroxyl radicals to the gas supply conduit 96 for supply into the internal combustion engine 90. Supplying the hydroxyl radicals into internal combustion engine 90 prior to combustion results in a decrease in the exhausted VOC radicals and can promote improved fuel burning.

It is understood that the embodiments illustrated in FIGS. 7A-7B are representative of a couple of scenarios in which the gas treatment systems including the respective gas treatment units can be implemented with an internal combustion engine. Those skilled in the art will appreciate that the various systems could be implemented with a multitude of different combustion engines and combustion processes that emit exhaust gas from the combustion of a fuel into the atmosphere through some type of conduit, and thus the examples of FIGS. 7A-7B are not meant to be limiting.

Referring now to FIG. 8, there is a schematic block diagram representative of an overall processing architecture of a gas treatment system 800 that is applicable to any of the systems describe herein according to an embodiment. In this embodiment, the architecture 800 is shown including the ultraviolet radiation sources 50 (UV radiation source(s)), the sensors 56 and the gas moving component 46 for the purposes of illustrating the interaction of some of the primary components that are used to provide a gas treatment to a gas stream in a gas conduit that includes applying hydroxyl radicals to reduce the presence of VOCs. It is understood that some of the other components mentioned in the various embodiments are not depicted for purposes of clarity (e.g., the water storage unit 74 and any accompanying components such as the valve 88 and a heater or heat exchanger).

As depicted in FIG. 8 and described herein, the gas treatment system 800 can include a control unit 54. In one embodiment, the control unit 54 can be implemented as a computer system 820 including an analysis program 830, which makes the computer system 820 operable to manage the ultraviolet radiation sources 50 and the sensors 56 in the manner described herein. In particular, the analysis program 830 can enable the computer system 820 to operate the ultraviolet radiation sources 50 to generate and direct ultraviolet radiation towards a surface of a photocatalyst component for producing hydroxyl radicals and process data corresponding to one or more attributes regarding the formation and supply of the radicals, which can be acquired by the sensors 56, and/or an ultraviolet radiation history stored as data 840. The computer system 820 can individually control each ultraviolet radiation source 50 and sensor 56 and/or control two or more of the ultraviolet radiation sources, the sensors 56 and the gas moving component 46 as a group. Furthermore, the ultraviolet radiation sources 50 can emit ultraviolet radiation of substantially the same wavelength or of multiple distinct wavelengths.

In an embodiment, during an initial period of operation, the computer system 820 can acquire data from at least one of the sensors 56 regarding one or more hydroxyl formation parameters and generate data 840 for further processing. The computer system 820 can use the data 840 to control one or more aspects of the ultraviolet radiation generated by the ultraviolet radiation source(s) 50 during an ultraviolet treatment of a gas stream as well as the gas flow and the gas pressure applied by the gas moving component 46 and temperature of the gas stream.

Furthermore, one or more aspects of the operation of the ultraviolet radiation sources 50 can be controlled or adjusted by a user 812 via an external interface I/O component 826B. The external interface I/O component 826B can be located on the exterior of any of the gas treatment systems, and used to allow the user 812 to selectively turn on/off the ultraviolet radiation sources 50 and/or the gas moving component 46.

The external interface I/O component 826B can include, for example, a touch screen that can selectively display user interface controls, such as control dials, which can enable the user 812 to adjust one or more of: an intensity, scheduling, and/or other operational properties of the set of ultraviolet radiation sources 50 (e.g., operating parameters, irradiation characteristics). In an embodiment, the external interface I/O component 826B could conceivably include a keyboard, a plurality of buttons, a joystick-like control mechanism, and/or the like, which can enable the user 812 to control one or more aspects of the operation of the set of ultraviolet radiation sources 50 as well as the hydroxyl formation parameters. The external interface I/O component 826B also can include any combination of various output devices (e.g., an LED, a visual display), which can be operated by the computer system 820 to provide status information pertaining to a gas treatment of a gas stream in a gas conduit with hydroxyl radicals for use by the user 812. For example, the external interface I/O component 826B can include one or more LEDs for emitting a visual light for the user 812, e.g., to indicate a status of the ultraviolet treatment of the gas stream. In an embodiment, the external interface I/O component 826B can include a speaker for providing an alarm (e.g., an auditory signal), e.g., for signaling that ultraviolet radiation is being generated or that a ultraviolet treatment has finished.

The computer system 820 is shown including a processing component 822 (e.g., one or more processors), a storage component 824 (e.g., a storage hierarchy), an input/output (I/O) component 826A (e.g., one or more I/O interfaces and/or devices), and a communications pathway 828. In general, the processing component 822 executes program code, such as the analysis program 830, which is at least partially fixed in the storage component 824. While executing program code, the processing component 822 can process data, which can result in reading and/or writing transformed data from/to the storage component 824 and/or the I/O component 826A for further processing. The pathway 828 provides a communications link between each of the components in the computer system 820. The I/O component 826A and/or the external interface I/O component 826B can comprise one or more human I/O devices, which enable a human user 812 to interact with the computer system 820 and/or one or more communications devices to enable a system user 812 to communicate with the computer system 820 using any type of communications link. To this extent, during execution by the computer system 820, the analysis program 830 can manage a set of interfaces (e.g., graphical user interface(s), application program interface, and/or the like) that enable human and/or system users 812 to interact with the analysis program 830. Furthermore, the analysis program 830 can manage (e.g., store, retrieve, create, manipulate, organize, present, etc.) the data, such as data 840, using any solution.

In any event, the computer system 820 can comprise one or more general purpose computing articles of manufacture (e.g., computing devices) capable of executing program code, such as the analysis program 830, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the analysis program 830 can be embodied as any combination of system software and/or application software.

Furthermore, the analysis program 830 can be implemented using a set of modules 832. In this case, a module 832 can enable the computer system 820 to perform a set of tasks used by the analysis program 830, and can be separately developed and/or implemented apart from other portions of the analysis program 830. When the computer system 820 comprises multiple computing devices, each computing device can have only a portion of the analysis program 830 fixed thereon (e.g., one or more modules 832). However, it is understood that the computer system 820 and the analysis program 830 are only representative of various possible equivalent monitoring and/or control systems that may perform a process described herein with regard to the control unit, the ultraviolet radiation sources and the sensors. To this extent, in other embodiments, the functionality provided by the computer system 820 and the analysis program 830 can be at least partially be implemented by one or more computing devices that include any combination of general and/or specific purpose hardware with or without program code. In each embodiment, the hardware and program code, if included, can be created using standard engineering and programming techniques, respectively. In another embodiment, the control unit can be implemented without any computing device, e.g., using a closed loop circuit implementing a feedback control loop in which the outputs of one or more sensors are used as inputs to control the operation of the cleaning treatment. It is understood that the functionality described in conjunction with a computing device, such as the computer system 820, can be implemented by any type of monitoring and/or control system.

Regardless, when the computer system 820 includes multiple computing devices, the computing devices can communicate over any type of communications link. Furthermore, while performing a process described herein, the computer system 820 can communicate with one or more other computer systems, such as the user 812, using any type of communications link. In either case, the communications link can comprise any combination of various types of wired and/or wireless links; comprise any combination of one or more types of networks; and/or utilize any combination disas of various types of transmission techniques and protocols.

All of the components depicted in FIG. 8 can receive power from a power component 845. The power component 845 can take the form of one or more batteries, a vibration power generator that can generate power based on magnetic inducted oscillations or stresses developed on a piezoelectric crystal, a wall plug for accessing electrical power supplied from a grid, and/or the like. In an embodiment, the power source can include a super capacitor that is rechargeable. Other power components that are suitable for use as the power component can include solar, a mechanical energy to electrical energy converter such as a piezoelectric crystal, a rechargeable device, etc.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system, comprising:
   a first gas conduit having a primary inlet, a secondary inlet, and an outlet, wherein the first gas conduit is configured to carry a stream of gas having a presence of volatile organic compounds (VOCs) that enters the first conduit through the primary inlet and exits the first conduit at the outlet;
   a second gas conduit having an inlet that receives a stream of treatment gas containing at least a partial pressure of water vapor, an outlet coupled to the secondary inlet of the first gas conduit, and a radiative chamber formed between the inlet of the second gas conduit and the outlet of the second gas conduit to receive the stream of treatment gas;
   a photocatalyst component positioned within the radiative chamber of the second gas conduit; and
   a set of ultraviolet radiation sources to irradiate the photocatalyst component with ultraviolet radiation, wherein the irradiated photocatalyst component disassociates the treatment gas into hydroxyl radicals, wherein the photocatalyst component is positioned at a predetermined distance from the outlet of the second gas conduit, wherein the predetermined distance maintains at least a 30% density level of hydroxyl radicals at the outlet of the second gas conduit for supply into the first gas conduit at the secondary inlet for treating the stream of gas to reduce the presence of the VOCs.

2. The system of claim 1, wherein the photocatalyst component comprises at least two commonly-shaped elements positioned in the stream of treatment gas.

3. The system of claim 2, wherein the at least two commonly-shaped elements have a elliptical shape that conform to a cross-sectional area of the second gas conduit.

4. The system of claim 2, wherein the at least two commonly-shaped elements comprise rectangular-shaped elements located centrally within the stream of treatment gas flowing through the second gas conduit, wherein the rectangular-shaped elements are separated by a predetermined spacing.

5. The system of claim 1, wherein at least a portion of the set of ultraviolet radiation sources are positioned upstream of the photocatalyst component.

6. The system of claim 1, wherein at least a portion of the set of ultraviolet radiation sources encircle the photocatalyst component.

7. The system of claim 1, wherein the set of ultraviolet radiation sources comprises a first group of ultraviolet light emitting devices and a second group of ultraviolet light emitting devices configured to operate in a pulsed mode, wherein the first group of ultraviolet light emitting devices is configured to produce a first burst of ultraviolet radiation and the second group of ultraviolet light emitting devices is configured to produce a second burst of ultraviolet radiation.

8. The system of claim 1, wherein the at least 30% density level of hydroxyl radicals at the outlet of the second gas conduit is a function of a plurality of hydroxyl formation parameters, the hydroxyl formation parameters including a density of the water vapor in the treatment gas, a flow speed of the treatment gas, a temperature of the treatment gas, a pressure of the treatment gas, and a radiation intensity of the set of ultraviolet radiation sources.

9. The system of claim 8, wherein the plurality of hydroxyl formation parameters are calibrated to account for thermodynamic and chemical properties of the stream of gas in the first gas conduit.

10. The system of claim 1, wherein the radiative chamber comprises a predetermined shape that enhances recycling of ultraviolet radiation generated from the set of ultraviolet radiation sources and a photocatalytic effect provided by the photocatalyst component.

11. The system of claim 1, further comprising a sod filtering unit located about the secondary inlet of the first gas conduit and the outlet of the second gas conduit, wherein the sod filtering unit is configured to prevent sod in the first gas conduit from entering the second gas conduit.

12. The system of claim 1, further comprising an ozone generator located about the inlet of the second gas conduit to generate ozone in the stream of treatment gas, wherein the irradiated photocatalyst component disassociates both the water vapor in the treatment gas and the ozone for an increased formation of the hydroxyl radicals.

13. The system of claim 1, further comprising a plasma generator positioned about the outlet of the first gas conduit to ionize a presence of VOCs in the stream of gas that remains in the first gas conduit after treatment by the hydroxyl radicals supplied by the second gas conduit.

14. The system of claim 1, further comprising a catalytic converter positioned about the outlet of the first gas conduit to oxidize a presence of VOCs in the stream of gas that remains in the first gas conduit after treatment by the hydroxyl radicals supplied by the second gas conduit.

15. A system, comprising:
a first gas conduit having a primary inlet, a secondary inlet, and an outlet, wherein the first gas conduit is configured to carry a first stream of gas having a presence of volatile organic compounds (VOCs) that enters the first conduit through the primary inlet and exits the first conduit at the outlet;
a second gas conduit having an inlet that receives a stream of treatment gas and an outlet coupled to the secondary inlet of the first gas conduit;
a water storage unit containing water that is operatively coupled with the first gas conduit and the second gas conduit, wherein the water in the water storage unit is heated by the gas in the first gas conduit, the heated water in the water storage unit imparting a predetermined partial pressure level of water vapor in the stream of treatment gas carried by the second gas conduit;
a gas moving component configured to direct the stream of treatment gas containing at least a partial pressure of water vapor towards the outlet of the second gas conduit for supply to the first gas conduit through the secondary inlet;
a gas treatment unit operatively coupled to the first gas conduit and the second gas conduit, wherein the gas treatment unit is configured to produce hydroxyl radicals from the water vapor in the stream of treatment gas carried by the second gas conduit and inject the hydroxyl radicals in the first gas conduit through the secondary inlet to decrease a presence of VOCs in the first stream of gas, the gas treatment unit including:
a photocatalyst component configured to receive the stream of treatment gas containing the at least a partial pressure of water vapor; and
at least one ultraviolet radiation source configured to irradiate the photocatalyst component with ultraviolet radiation, wherein the irradiated photocatalyst component disassociates the treatment gas containing at least a partial pressure of water vapor for formation of the hydroxyl radicals, wherein the photocatalyst component is positioned at a predetermined distance from the secondary inlet of the first gas conduit, wherein the predetermined distance maintains at least a 30% density level of hydroxyl radicals at the secondary inlet for treating the stream of gas in the first gas conduit to reduce the presence of the VOCs.

16. The system of claim 15, wherein the gas treatment unit is positioned exterior to the first gas conduit.

17. The system of claim 15, wherein the second gas conduit, the gas moving component, and the gas treatment unit maintain a positive pressure with respect to the first gas conduit.

18. The system of claim 15, wherein the gas treatment unit further comprises:
at least one sensor located about the stream of treatment gas to attain operational data associated with the second stream of gas; and
a control unit, operatively coupled to the at least one sensor, the water storage unit, the gas moving component, and the at least one ultraviolet radiation source, wherein the control unit is configured to adjust the temperature of the water in the water storage unit, the intensity of radiation emitted from the at least one ultraviolet radiation source, and the flow of the stream of treatment gas that is provided by the gas moving component in response to the operational data detected by the at least one sensor.

19. The system of claim 15, further comprising a valve operatively coupled to the second gas conduit and the water storage unit, wherein the valve is configured to release heated water from the water storage unit into the stream of treatment gas in the second gas conduit.

20. A system, comprising:
an internal combustion engine;
a gas conduit to supply fuel to the internal combustion engine for combustion of the fuel;
an exhaust gas conduit to release exhaust gases from the internal combustion engine after combustion of the fuel; and
a gas treatment unit, operatively coupled to at least one of the gas conduit or the exhaust gas conduit, to supply hydroxyl radicals that decrease a presence of volatile organic compounds (VOCs) in the gas conduits, the gas treatment unit including:

a gas treatment conduit having an inlet that receives a stream of treatment gas containing at least a partial pressure of water vapor, an outlet coupled to at least one of the gas conduit or the exhaust gas conduit;

a gas moving component configured to direct the stream of treatment gas containing the at least a partial pressure of water vapor towards the outlet of the gas treatment conduit for supply to at least one of the gas conduit or the exhaust gas conduit;

a photocatalyst component configured to receive the stream of treatment gas containing the at least a partial pressure of water vapor driven by the gas moving component; and at least one ultraviolet radiation source configured to irradiate the photocatalyst component with ultraviolet radiation, wherein the irradiated photocatalyst component disassociates the treatment gas into the hydroxyl radicals, wherein the photocatalyst component is positioned at a predetermined distance from the outlet of the gas treatment conduit, wherein the predetermined distance maintains at least a 30% density level of hydroxyl radicals delivered to the outlet of the gas treatment conduit by the gas moving component for supply into at least one of the gas conduit or the exhaust gas conduit, for treating the VOCs.

* * * * *